United States Patent
Takanashi et al.

(10) Patent No.: US 7,505,685 B2
(45) Date of Patent: Mar. 17, 2009

(54) WAVELENGTH-DIVISION MULTIPLEX COMMUNICATION SYSTEM AND APPARATUS

(75) Inventors: Takako Takanashi, Kawasaki (JP); Futoshi Izumi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 777 days.

(21) Appl. No.: 10/288,022

(22) Filed: Nov. 5, 2002

(65) Prior Publication Data
US 2004/0213566 A1    Oct. 28, 2004

(30) Foreign Application Priority Data
Apr. 19, 2002    (JP)    ............... 2002-117766

(51) Int. Cl.
*H04B 10/08*    (2006.01)
*H04B 17/00*    (2006.01)
(52) U.S. Cl. ............... 398/32; 398/26; 398/34
(58) Field of Classification Search ............ 398/30, 398/32, 33, 34, 95, 26
See application file for complete search history.

(56) References Cited

U.S. PATENT DOCUMENTS

| | | | |
|---|---|---|---|
| 4,797,879 A | | 1/1989 | Habbab et al. |
| 5,212,577 A | * | 5/1993 | Nakamura et al. ............ 398/79 |
| 5,319,485 A | | 6/1994 | Yasui et al. |
| 5,777,761 A | * | 7/1998 | Fee ............... 398/7 |
| 6,310,708 B1 | | 10/2001 | Ota et al. |
| 6,441,935 B1 | | 8/2002 | Araki et al. |
| 2001/0055148 A1 | | 12/2001 | Kikuchi et al. |
| 2002/0101635 A1 | * | 8/2002 | Taketomi ............ 359/124 |

FOREIGN PATENT DOCUMENTS

| | | |
|---|---|---|
| EP | 0 294 133 | 12/1988 |
| EP | 0 942 548 | 9/1999 |
| EP | 1 083 697 | 3/2001 |
| EP | 1 117 202 | 7/2001 |
| JP | 3-117233 | 5/1991 |
| JP | 11-103275 | 4/1999 |
| JP | 11-177624 | 7/1999 |
| JP | 2000-228649 | 8/2000 |
| JP | 2000-358013 | 12/2000 |
| JP | 2001-45069 | 2/2001 |
| WO | WO 01/63819 * | 8/2001 |

OTHER PUBLICATIONS

Partial European Search Report dated Mar. 9, 2006.
Notice of Ground of Rejection mailed May 30, 2006.
European Search Report dated Jun. 28, 2006.

* cited by examiner

*Primary Examiner*—Nathan M Curs
(74) *Attorney, Agent, or Firm*—Katten Muchin Rosenman LLP

(57) ABSTRACT

In the WDM communication system, in the absence of data to be transmitted on an optical channel, a pilot signal transmitting means transmits the channel-unique pilot signal data on the channel. A WDM communication apparatus on a receiving end detects the pilot signal data in the received WDM signals, and on the basis of the detection result, it evaluates whether each channel is used or not. It is thus easy to recognize which channel is unused (idle) of the WDM signals, so that channel resources can be used effectively according to the traffic.

23 Claims, 29 Drawing Sheets

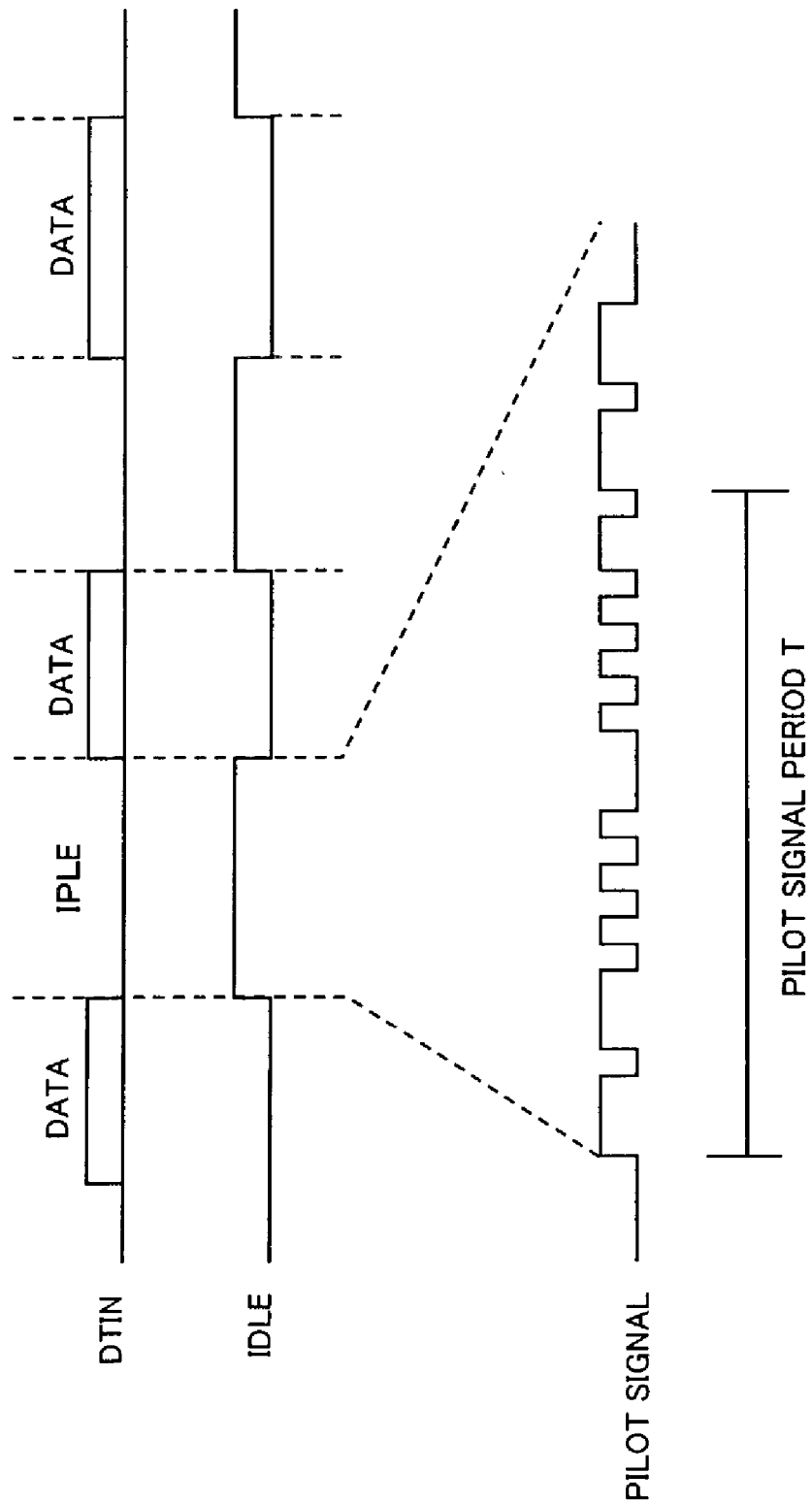

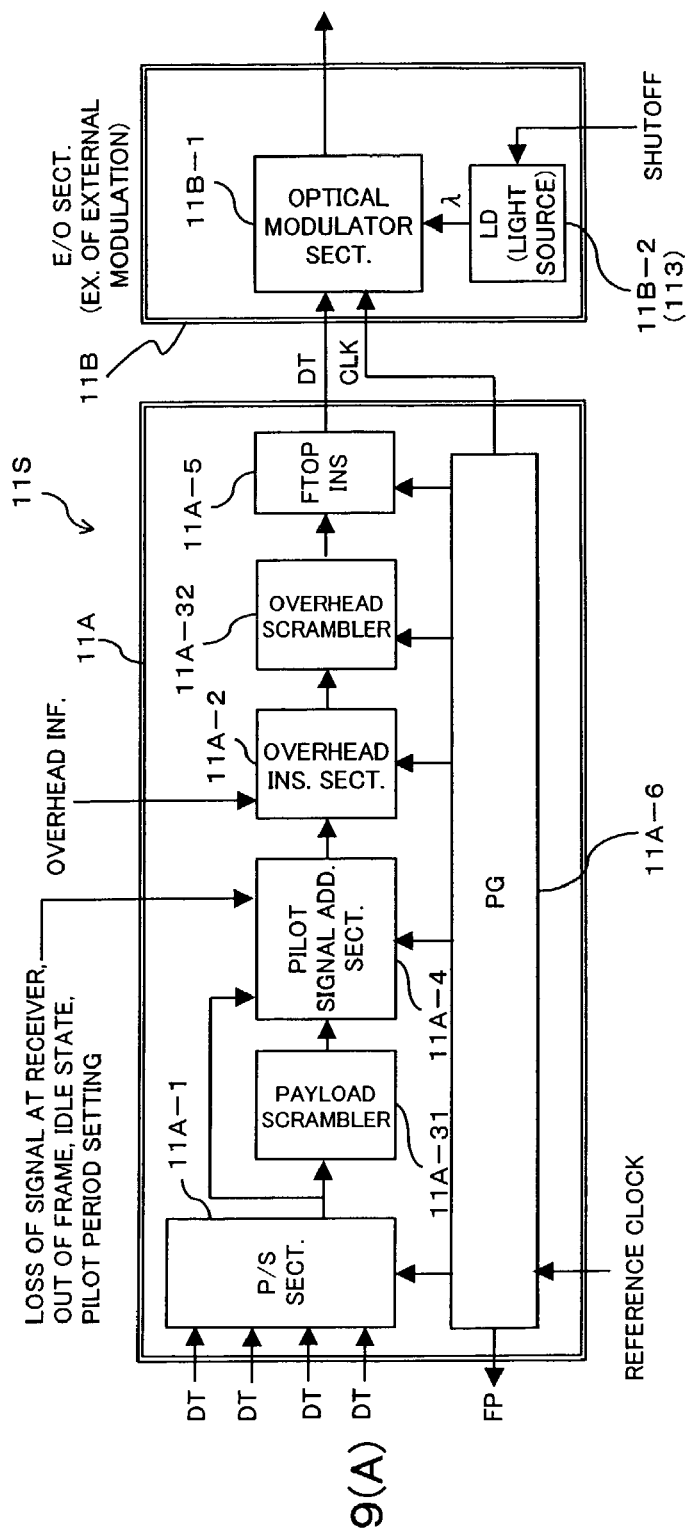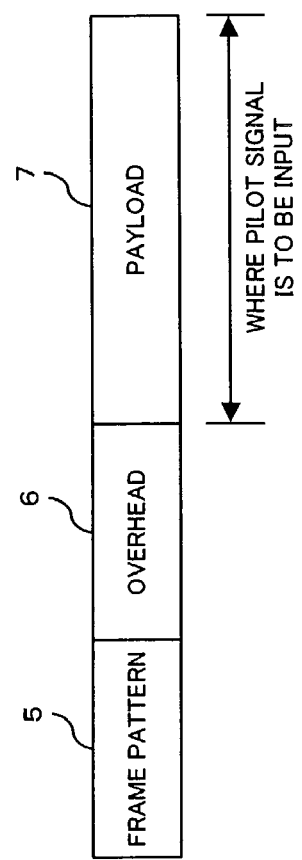
FIG. 9(A)
FIG. 9(B)

WAVELENGTH-DIVISION MULTIPLEX COMMUNICATION SYSTEM AND APPARATUS

BACKGROUND OF THE INVENTION

1. Field of the Invention

The present invention relates to a wavelength-division multiplex communication system and wavelength-division multiplex communication apparatus for use in the system.

2. Description of the Related Art

FIG. 27 shows an example of an existing wavelength-division multiplex (WDM) communication system. Referring to FIG. 27, a WDM communication system 100 has terminal equipment, 200 and 400, coupled to a communication network, such as an ATM (Asynchronous Transfer Mode) network, a SONET (Synchronous Optical Network), an SDH (Synchronous Digital Hierarchy) network, or an Ethernet (a registered trademark of Xerox Corporation), and an optical repeater 300 which is disposed between the terminal equipment, 200 and 400, and is coupled to them through an optical transmission path (an optical fiber such as a SMF (Single Mode Fiber)), 500 and 600. The optical repeater 300 amplifies and relays WDM signals bi-directionally transmitted over the optical transmission path 500 and 600. The number of the optical repeaters (ILA) 300 required depends on a distance over which the WDM signals have to travel.

The terminal equipment (hereinafter simply called "terminal") 200 (400) has, for example, a transponder (transceiver) 201 (401), a wavelength-division multiplexer (WDM coupler) 202 (402), and an optical amplifier, 203 (403) and 204 (404), such as an EDFA (Erbium Doped Fiber Amplifier). The optical repeater (hereinafter also called "repeater station") 300 has a relay light amplifier, 301 and 302, such as an EDFA.

In the WDM communication system 100, the transponder 201 (401) of the terminal 200 (400) receives transmission signals through a required network (an ATM network, a SONET, an SDH network, or an Ethernet) and converts the received signals into light signals at predetermined wavelengths (channels). The WDM coupler 202 (402) multiplexes the resulting channels into WDM signals. The optical amplifier 203 (403) then simultaneously amplifies the WDM signals up to predetermined signal levels (power), and the amplified WDM signals are sent out on the optical transmission path 500 (600).

The WDM signals thus sent out on the optical transmission path 500 (600) are input to a repeater station 300. The optical amplifier 301 (302) simultaneously amplifies the weakened WDM signals up to desired signal levels, thereby compensating for losses caused during transmission, and the amplified WDM signals are received by an opposing terminal equipment 400 (200) on a receiving end. In the receiver terminal 400 (200), an optical amplifier 404 (204) simultaneously amplifies the WDM signals, which have been received through the optical transmission path 500 (600), once again, thereby compensating for losses caused during transmission. A demultiplexer 405 (205) separates the amplified WDM signals into channels at wavelengths, and each of the thus separated channels is converted into an electric signal by the transponder 401 (201). The resulting electric signals are then sent out as transmission signals on a desired network, such as an ATM network, a SONET, an SDH network, or an Ethernet.

In such a WDM communication system 100, it is better known that transmission loss varies with the wavelength transmitted, across the transmission band of the optical transmission path 500(600). As a countermeasure, the spectrum of output or input WDM signals is monitored to separately adjust (pre-emphasis control) the transmission levels of light signals at different wavelengths (channels), so that a tilt caused in the WDM signals can be compensated for.

For this purpose, as shown in FIG. 28, for example, in the terminal 200 (400), the optical coupler 208 (408) and 209 (409) splits off part of the output of optical amplifiers 203 (403) and 204 (404), respectively, into a spectrum analyzer (SAU: Spectrum Analyzer Unit) 210 (410), where the monitoring of the spectrum of the output or input WDM signals is performed. Likewise, in the repeater station 300, as shown in FIG. 29, the optical couplers 304 and 305 split off part of outputs of the optical amplifiers 301 and 302, respectively, into an SAU 306, where the monitoring of the spectrum of the output or input WDM signals is performed.

In accordance with the monitoring result, a CPU 706 of the SAU, 210 (410) and 306, (described later) generates required monitoring control information (pre-emphasis setting information, or the like), and this monitoring control information is superimposed on an optical channel that is previously assigned as an OSC, by an OSC section 219 (419) in the terminal 200 (400) and by an OSC section 307 (or 310) in the repeater station 300. An optical coupler, 220 (420) and 308, then inserts the optical channel as part (an OSC channel signal) of the WDM signals to be transmitted on an optical transmission path, 500 and 600.

In the terminal 200 (400) of FIG. 28, the reference number "206 (406)" designates an optical variable attenuator for controlling the transmission level of a transmission light signal input from the transponder 201 (401). The reference number "207 (407)" designates a photodiode (PD) for receiving the light signal, which has been controlled in transmission level by the optical variable attenuator 206, and converting the light signal into an electric signal, and then inputting the resulting electric signal both into an optical circuit 212 (412) (described later) and into an OSC 219 (419). The reference number "221 (421)" designates an optical coupler for splitting off part of the WDM signals, which is received through the optical transmission path 600, into the OSC section 219 (419).

Further, in the repeater station 300 of FIG. 29, the reference number "303 (309)" designates an optical coupler for receiving the WDM signals input through the optical transmission path 500 (600) and splitting off part of the WDM signal into an OSC section (309) for the purpose of receiving an OSC channel signal. The reference number "311" designates an optical coupler for inserting an OSC channel signal into an output WDM signal to be sent out on an optical transmission path 600.

Concretely, each of the SAU 210 (410) of the terminal 200 (400) in FIG. 28 and the SAU 306 of the repeater station 300 in FIG. 29, has a switch 701, an optical circuit employing a PD array 703, an analog amplifier 704, an AD (Analog to Digital) converter 705, a CPU 706, a bias circuit 707, and a DA (Digital to Analog) converter 708.

With this construction, in the SAU, 210 (410) and 306, in response to an instruction given by the CPU 706, the switch 701 selects one of the two inputs, the WDM signals to be sent out on an optical transmission path 500 and the WDM signals to be sent out on an optical transmission path 600, to output to an optical circuit 702. The input WDM signals at separate wavelengths are then converted by the PD array 703 into electric signals. At that time, the CPU 706 adjusts, if necessary, a bias applied to the PD array 703, via the DA converter 708.

The analog amplifier 704 amplifies the thus obtained electric signals up to desired levels, and the AD converter 705 then converts the electric signals into digital form to input to the CPU 706. The CPU 706 analyzes the spectrum of the input WDM signal on each channel, or each WDM signal to be sent out on an optical transmission path 500 or 600, to generate required monitoring control information.

The above-described SAU 210 (410), however, employs an highly expensive optical circuit 702 (PD array 703), thereby significantly increasing costs for manufacturing the terminal 200 (400) and the repeater station 300.

Further, since the WDM communication apparatus (terminal 200 (400) or repeater station 300) combines optical channels at separate wavelengths into WDM signals, increase in line traffic on a specific channel causes access congestion in the channel, thus impairing the transmission efficiency. Hence, even in a communication apparatus, such as a WDM communication apparatus, with a large amount of transmission capacity, if the traffic is increased, it will affect better use of the transmission capacity.

Therefore, in a case where an apparatus is coupled to the WDM communication apparatus through a WDM line, the access should be balanced among the channels. As is evident from FIGS. 28 and 29, however, since the WDM communication apparatus itself never converts light signals into electric form, it is impossible for the apparatus to recognize how much traffic the individual channels bear.

SUMMARY OF THE INVENTION

With the foregoing problems in view, it is an object of the present invention to provide a wavelength-division multiplex (WDM) communication system and a WDM communication apparatus in which the monitoring of the spectrum of WDM signals is realized without using any expensive optical circuits, and also in which unused (idle) channels are easily identified, so that effective use of channel resources according to traffic can be realized.

In order to accomplish the above object, according to the present invention, the present WDM communication system comprises a plurality of wavelength-division multiplex (WDM) communication apparatus, interconnected one another across an optical network, for transmitting a plurality of WDM optical channels at separate wavelengths, and of the plurality of WDM communication apparatus, a first WDM communication apparatus which sends out WDM optical channels, includes: (1) means for evaluating whether or not data to be transmitted on an object one of the plurality of WDM optical channels exists; and (2) means for transmitting, if the evaluating means judges that data to be transmitted on the object WDM optical channel is absent, pilot signal data which is unique to the object WDM optical channel, and a second WDM communication apparatus which receives the WDM optical channels from the first WDM communication apparatus, includes: (3) means for detecting the pilot signal data in the received WDM optical channels; and (4) means for evaluating whether or not each of the plurality of WDM optical channels is idle, based on detection results obtained by the pilot signal detecting means (3).

As a generic feature, the preset WDM apparatus comprises: (1) means for evaluating whether or not data to be transmitted on an object one of the plurality of WDM optical channels exists; and (2) means for transmitting, if the evaluating means judges that data to be transmitted on the object WDM optical channel is absent, pilot signal data which is unique to the object WDM optical channel.

As a preferred feature, the pilot signal transmitting means includes a framing section for framing a frame signal containing an overhead and a payload, which framing section stores the transmission data in the payload of the frame signal. The framing section includes a pilot signal adding section for storing the pilot signal data in either one or both of the overhead and the payload, if the evaluating means judges that data to be transmitted on the object WDM optical channel is absent.

As another generic feature, the present WDM apparatus comprises: (1) means for detecting a channel-unique pilot signal data, which is transmitted on an idle WDM optical channel with no data being carried thereon, in received WDM optical channels; and (2) means for evaluating whether or not each of the plurality of WDM optical channels is idle, according to detection results obtained by the pilot signal detecting means.

As another preferred feature, the present WDM apparatus further comprises means for measuring a spectrum of each of the WDM optical channels, and the foregoing pilot signal detecting means includes: an opto-electric converter for receiving the plurality of WDM optical channels at separate wavelengths and outputting an electric signal corresponding to optical power of the channels; and a pilot-signal-detecting filter section for transmitting, of the electric signal received from the opto-electric converter, a pilot signal data component unique to an idle WDM optical channel, which currently carries no data. The spectrum measuring means measures the spectrum of each of the WDM optical channels according to amplitude information of the pilot signal data component which passes through the pilot-signal-detecting filter section.

As a still another generic feature, the present WDM communication apparatus comprises:

a transmitter, including: means for evaluating whether or not data to be transmitted on an object one of the plurality of WDM optical channels exists; and means for transmitting, if the evaluating means judges that data to be transmitted on the object WDM optical channel is absent, pilot signal data, which is unique to the object WDM optical channel, to a second WDM communication apparatus of the wavelength-division multiplexed communication system;

a receiver, including: means for detecting pilot signal data in WDM optical channels which are received from the second WDM communication apparatus; and means for evaluating whether or not each of the plurality of WDM optical channels is idle, based on detection results obtained by the pilot signal detecting means; and means for stopping, upon detection of the pilot signal data by the pilot signal detecting means of the receiver, the pilot signal transmitting means from transmitting the pilot signal data on an WDM optical channel which corresponds to the detected pilot signal.

As a further generic feature, the present WDM communication apparatus comprises: means for detecting pilot signal data, which indicates absence of data being transmitted on a WDM optical channel, in the plurality of WDM optical channels, including: an opto-electric converter for receiving the plurality of WDM optical channels at separate wavelengths and outputting an electric signal corresponding to optical power of the channels; and a pilot-signal-detecting filter section for transmitting, of the electric signal received from the opto-electric converter, a pilot signal data component unique to an idle WDM optical channel, which currently transmits no data; and means for measuring a spectrum of each of the WDM optical channels according to amplitude information of the pilot signal data component which passes through the pilot-signal-detecting filter section.

As still another preferred feature, the pilot-signal-detecting filter section includes: a lowpass filter for blocking, of an electric signal received from the opto-electric converter, a frequency component higher than the pilot signal data component; and a plurality of bandpass filters, one for each group of WDM optical channels. Each of the bandpass filters has variable passbands and transmitting pilot signal data components of output of the lowpass filter, which components correspond to the passbands of the individual bandpass filters.

As a further preferred feature, the spectrum measuring means includes: an error-correction-factor calculating section for calculating an error correction factor such that, if inputs of a same channel enter the plurality of variable bandpass filters at initialization of the apparatus, a same pilot signal data component is output from each of the plurality of variable bandpass filters; and an error correcting section for correcting errors in output of the plurality of variable bandpass filters based on the error correction factor, which has been calculated by the error-correction-factor calculating section.

As a still further preferred feature, the spectrum measuring section includes: a holder circuit for holding such amplitude information of the individual WDM optical channels separately; and an optical signal quality calculating section for calculating quality of the individual WDM optical channels based on amplitude information of the individual WDM optical channels which is obtained while the channels are idle, which amplitude information is stored in the holder circuit.

The WDM communication system and apparatus of the present invention guarantee the following advantageous results.

(1) A wavelength-division multiplex (WDM) communication apparatus on a transmitting end uses an idle (with no transmission data superimposed thereon) one of the optical channels of wavelength-division multiplex (WDM) signals to transmit pilot signal data unique to the idle channel, and the pilot signal data is detected by another wavelength-division multiplex (WDM) communication apparatus on a receiving end. It is thus possible to recognize which channels of the WDM signals are busy/idle, so that active communication control according to the channel busy/idle state can be realized. For example, since an OSC of a WDM communication apparatus notifies another WDM communication apparatus of the channel busy/idle state, it becomes possible for the latter apparatus to use an idle channel to newly establish communication.

(2) The input WDM signals are converted into electric signals corresponding to optical power of the WDM signals, and of the resulting electric signals, only a channel-unique pilot signal data component passes through a pilot signal detecting filter section (lowpass filter and bandpass filter). According to amplitude information of the component which passed through the filter section, the spectrum of each WDM channel is measured, so that spectrum measurement of the WDM signals can be realized without using any expensive optical circuit.

(3) On spectrum measurement, where a pilot signal data is transmitted on an idle channel with no data superimposed thereon, a holder circuit pre-stores the foregoing amplitude information for each wavelength separately, and on the basis of each item of the amplitude information that is obtained while each channel is idle, signal quality of the WDM optical signals is calculated. Hence, even if pilot signals cannot be detected in real time on all of the channels concurrently, it is still possible to measure the spectrum of the input WDM signals in a normal way.

(4) With the elapse of a predetermined maximum available period that has been previously set for a channel, data transmission on that channel is halted, thus making the channel idle, and pilot signal data is then transmitted on the channel for a specific period. With such a construction, if pilot signal data is not detected on a receiving end in the predetermined time period, the channel corresponding to that pilot signal data is regarded as being in a state of input interruption (loss-of-signal). As a result, there is no need for a dedicated loss-of-signal state detecting function, and an equivalent function will be realized utilizing the above-described pilot signal data.

(5) The WDM signals on multiple channels are divided into several channel groups, and variable bandpass filters are provided, one for each channel group, to detect pilot signal data corresponding to each channel group. At initialization of the apparatus, an error correction factor is calculated such that, if inputs of one and the same channel enter the variable bandpass filters, the same pilot signal data component is output from each of the variable bandpass filters. While the apparatus is in operation afterward, errors appearing in output of the variable bandpass filters can be corrected based on the thus obtained error correction factor. As a result, in a case where the variable bandpass filters are arranged, one for each channel, in parallel, it is possible to correct detection errors among the channels, thereby realizing spectrum measurement with improved accuracy.

Other objects and further features of the present invention will be apparent from the following detailed description when read in conjunction with the accompanying drawings.

BRIEF DESCRIPTION OF THE DRAWINGS

FIG. 6 is a view for describing transmission timing with which a pilot signal is sent out in the present embodiment;

FIG. 9(A) is a block diagram depicting a transponder (transmitter) of FIG. 1 in a third mode;

FIG. 9(B) is a view for describing where in a data frame to insert a pilot signal, when the transponder is constructed as in FIG. 9(A);

DESCRIPTION OF THE PREFERRED EMBODIMENT(S)

One preferred embodiment of the present invention will now be described with reference to the accompanying relevant drawings.

Figure 1:
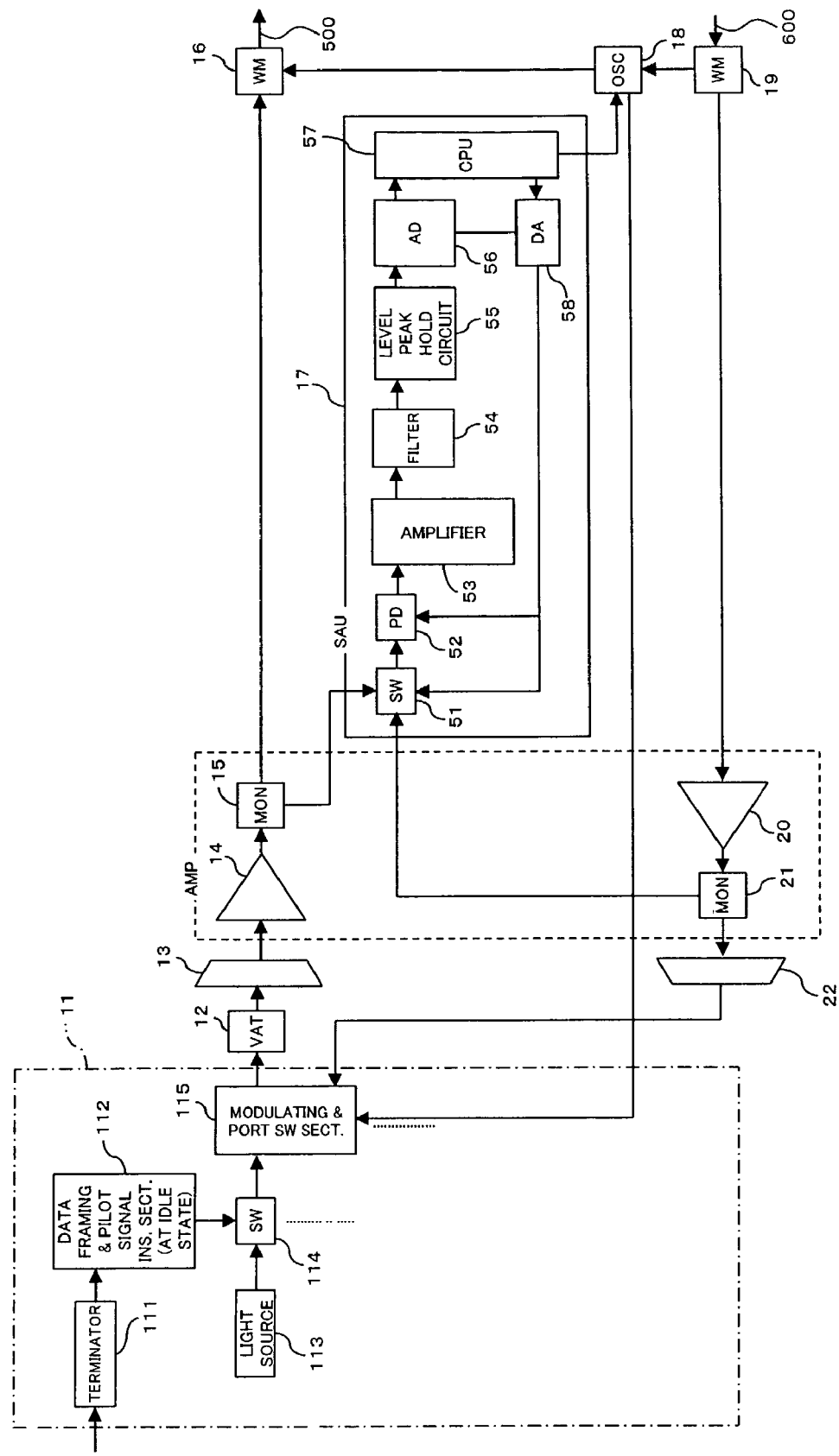
FIG. 1 is a block diagram depicting terminal equipment for use in a wavelength-division multiplex (WDM) communication system of one embodiment of the present invention.
Figure 2:
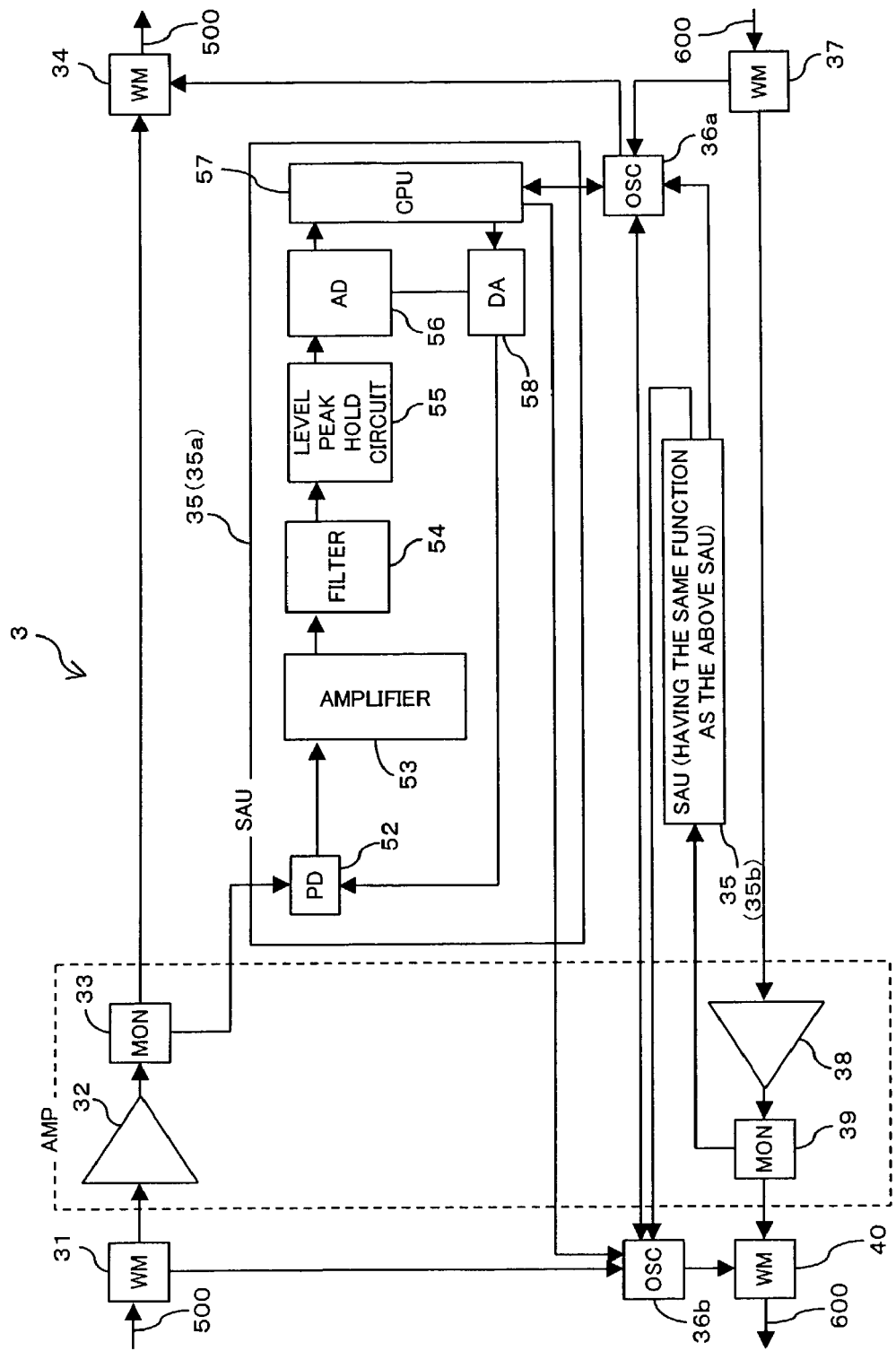
FIG. 2 is a block diagram depicting a repeater station for use in a WDM communication system of one embodiment of the present invention.
Figure 27:
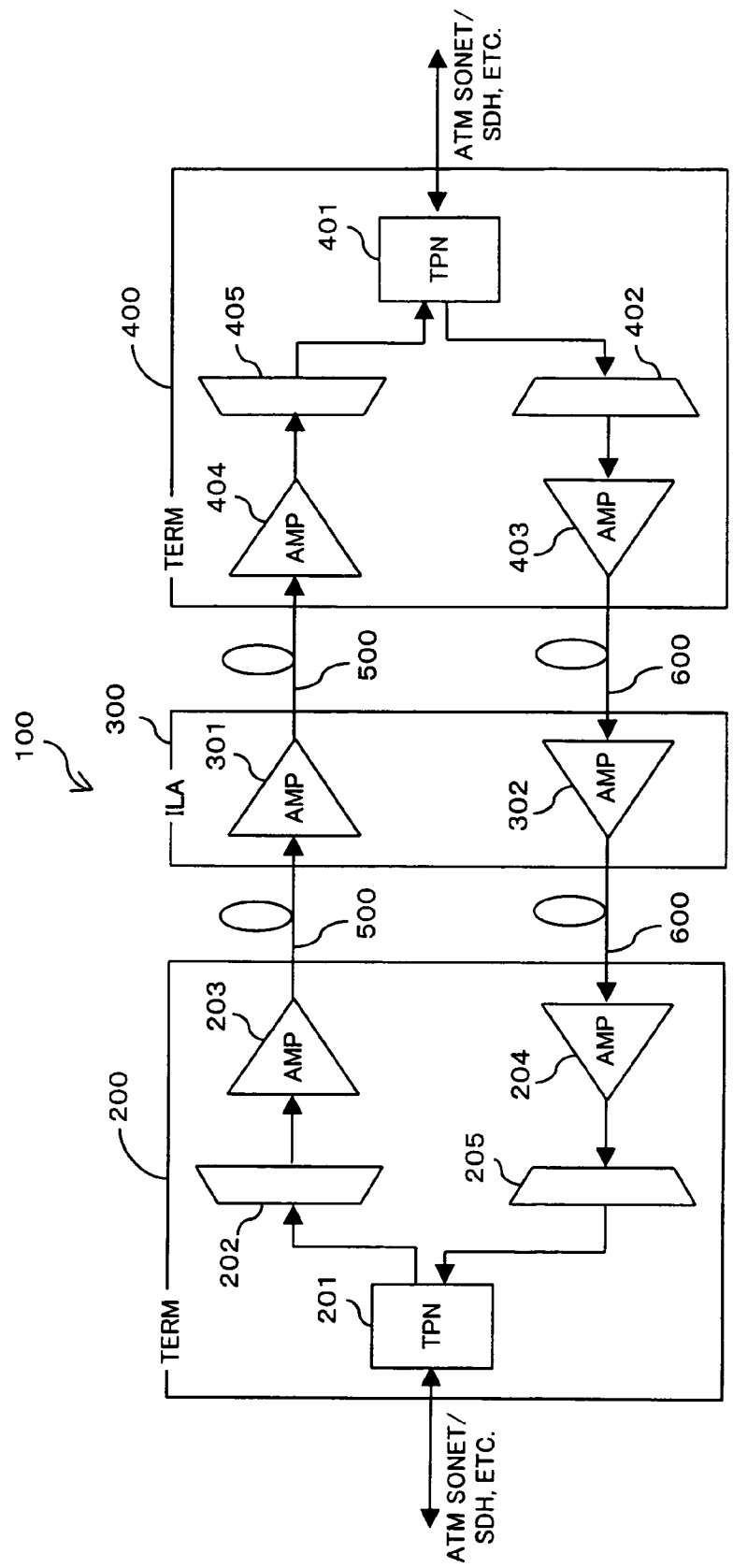
FIG. 27 is a block diagram depicting an example of an existing WDM communication system.
Figure 28:
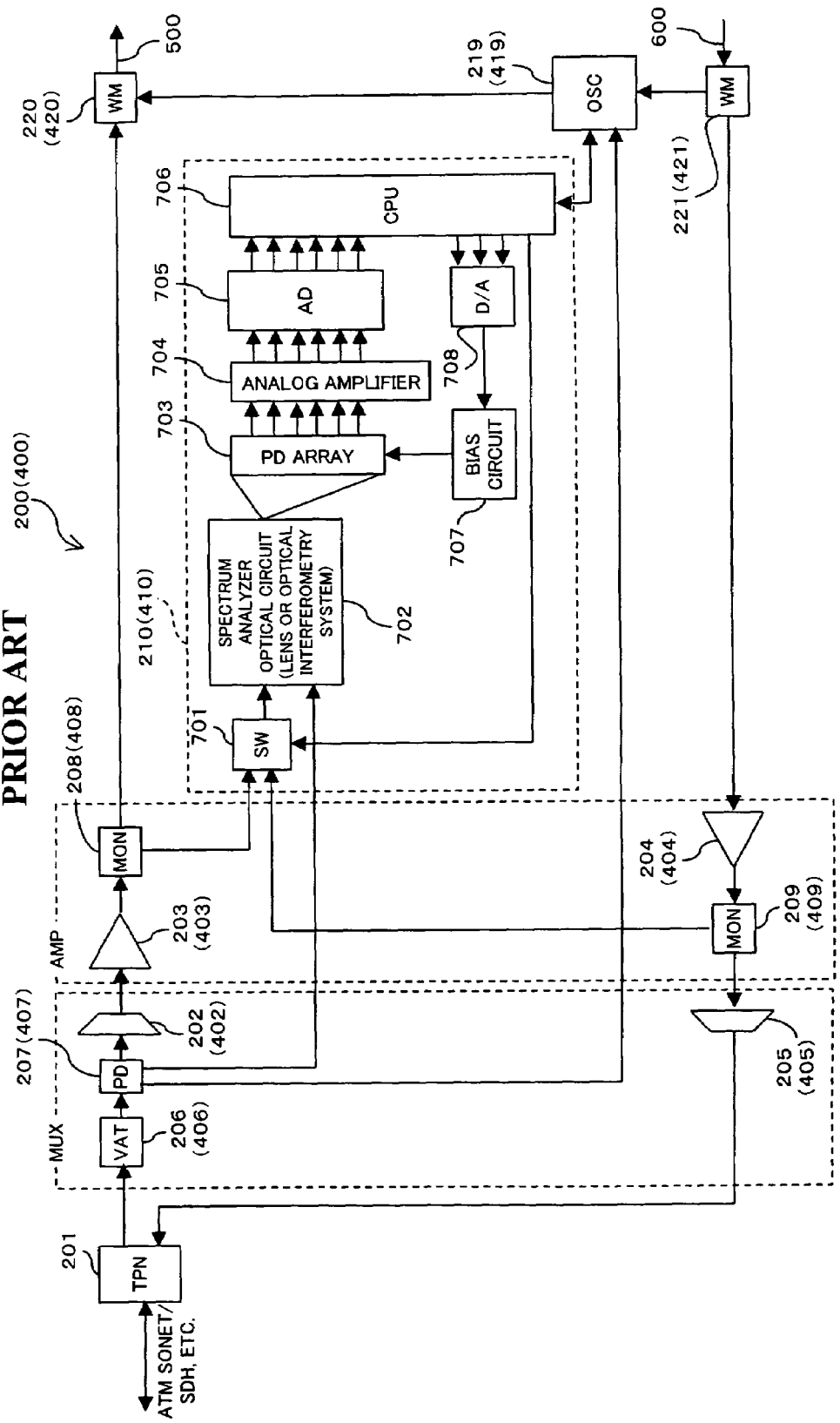
FIG. 28 is a block diagram depicting terminal equipment of FIG. 27.
Figure 29:
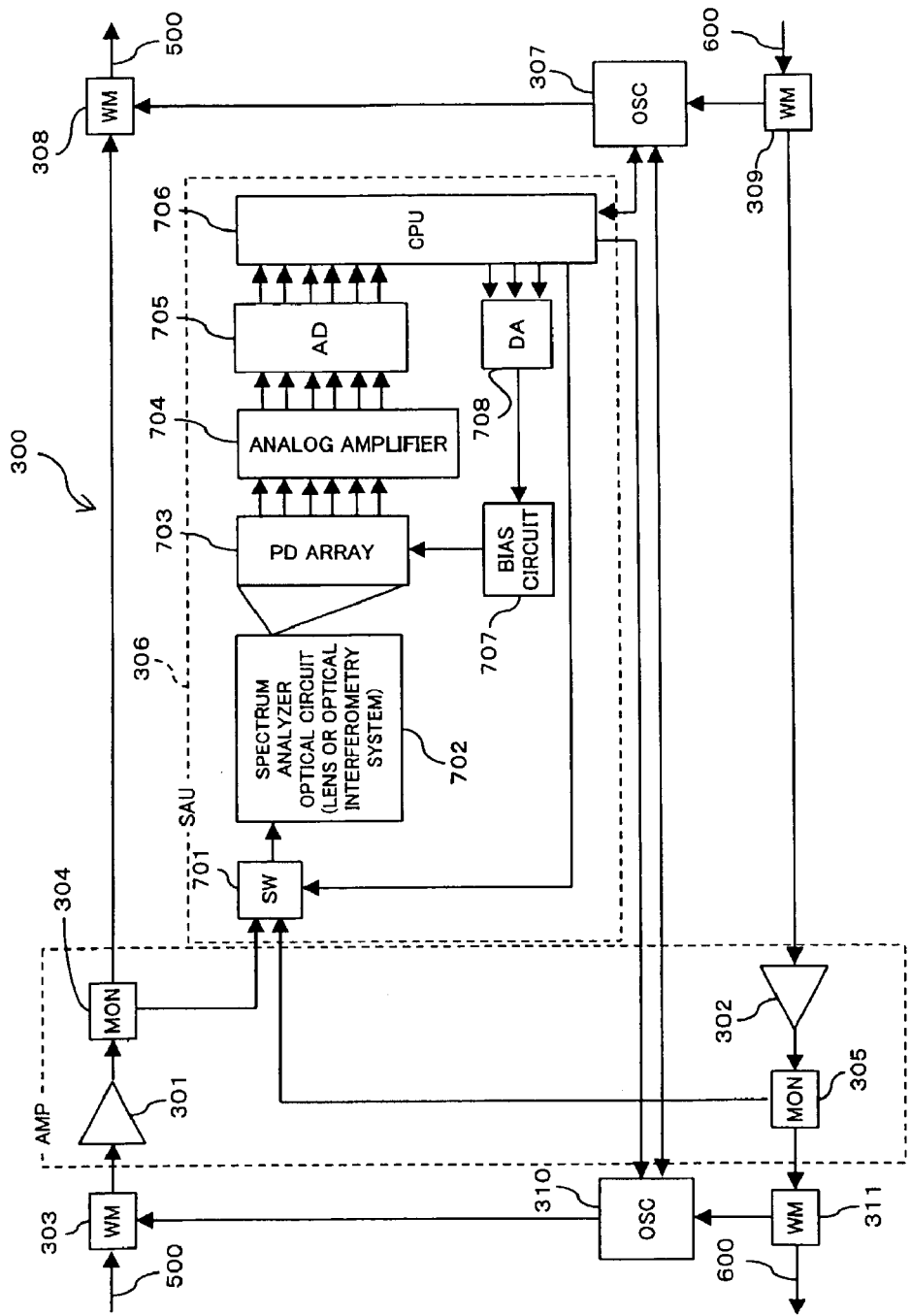
FIG. 29 is a block diagram depicting a repeater station of FIG. 28.

(A) WDM Communication System:

FIG. 1 shows a construction of terminal equipment for use in a wavelength-division multiplex (WDM) communication system according to a first embodiment of the present invention, and FIG. 2 shows a construction of a repeater station for use in the WDM communication system. Terminal equipment (hereinafter also simply called "terminal") 1 is equivalent to terminal equipment 200 and 400 of FIG. 27, and a repeater station 3 is equivalent to a repeater station 300 of FIG. 27. As in the prior art, the terminal equipment 1 and the repeater station 3 are interconnected to one another across an optical transmission path 500, 600, in the present embodiment.

Referring now to FIG. 1, terminal 1 of the present embodiment has a transponder (transceiver section) 11; variable optical attenuators 12, one for each WDM channel; a wavelength-division multiplexer (beam combining coupler) 13; optical amplifiers 14 and 20; monitor beam splitting couplers 15 and 21; an OSC beam inserting coupler 16; a spectrum analyzer unit (SAU) 17; an OSC unit 18; OSC beam splitting coupler 19; and a wavelength-division demultiplexer (beam splitting coupler) 22.

Here, the transponder 11 receives a signal through some network such as Gigabit Ethernet (a registered trademark of Xerox Corporation), SONET/SDH, and ATM, and converts the received signal into a light signal at a predetermined wavelength, and then sends the converted light signal to a WDM communication system. In the mean time, the transponder 11 also receives WDM signals at separate wavelengths (hereinafter called "WDM optical channels", or simply "WDM channels") from a WDM communication system, and then converts the received channels into signals suitable for use in communication over the above-mentioned networks. In the present embodiment, a transmitter of the transponder 11 has, for example, a terminator section 111, a data-framing and pilot-signal-inserting section 112, a light source (LD: Laser Diode) 113, an optical switch 114, and an optical modulating and port-switching section 115.

The terminator section 111 temporarily terminates a signal frame which is transmitted over the above network, and the data-framing and pilot-signal-inserting section 112 stores signal data—(user) data to be transmitted on a wavelength-division multiplexed channel-input from the terminator section 111 into a predetermined transmission signal frame (a frame construction will be detailed later). In the present embodiment, if such valid user data to be transmitted is absent, fixed-pattern data (pilot signal data) is stored in the frame.

With this construction, in a case where the WDM communication system communicates with a network, such as Gigabit Ethernet or an ATM network, in which burst transmission is performed, an idle optical channel, with no user data superimposed thereon, carries such pilot signal data. Accordingly, upon detection of the pilot signal data on a WDM channel at a receiving end of the WDM communication system, the channel is recognized to be idle. Additionally, since each WDM optical channel is given channel-unique pilot signal data, it is also possible for the receiving end to evaluate whether each WDM channel is busy or idle (a channel busy/idle state).

The light source 113 generates a light beam at a predetermined wavelength which is to be wavelength-division multiplexed into WDM signals, and the optical switch 114 can stop the light source 113 from emitting the light beam. The modulating and port-switching section 115 serves functions of: (1) a transmitter for modulating the light beam, emitted from the light source 113, with output of the data-framing and pilot-signal-inserting section 112, thereby generating an output light signal with the foregoing signal frame; (2) a receiver for converting and terminating optical channels which have been separated by the beam-splitting coupler 22, into electric form for performing desired signal receiving processing thereon; and (3) switching the transmitting/receiving signals among multiple output destinations (ports). Such port-switching is performed in accordance with instructions (the channel busy/idle state at a downstream side) given by an OSC unit 18 (described later).

The variable optical attenuator 12 controls light signals at separate wavelengths output from the modulating and port-switching section 115 in optical transmission level, by separately adjusting the degree of attenuating for each of the light signals. The beam-combining coupler 13 combines (wavelength-division multiplexes) the optical-transmission-level-controlled light signals, which have been output from the variable optical attenuator 12, thereby generating WDM signals for transmission.

The optical amplifier 14 simultaneously amplifies the WDM signals input from the beam-combining coupler 13 to compensate for losses which will be caused by light splitting by the monitor beam splitting coupler 15 and the OSC beam inserting coupler 16, disposed subsequently to the optical amplifier 14. For example, an EDFA (Erbium-doped Fiber Amplifier) is a typical example of the optical amplifier 14. The monitor beam splitting coupler 15 splits the input from the optical amplifier 14 into two outputs, and then inputs one of the two outputs to the SAU 17 for monitoring its spectrum. The OSC beam inserting coupler 16 receives from the OSC unit 18 a light signal at a wavelength (supervisory control information) which is previously determined as an OSC channel, and combines the received light signal with the remaining one of the above outputs of the optical amplifier 14.

The OSC beam splitting coupler 19 splits WDM signals received from a downstream side into two outputs and directs one of them into the OSC unit 18. The OSC unit 18 extracts OSC supervisory control information (including the aforementioned channel busy/idle state) from the received WDM signals, so that the above-mentioned instructions to the modulating and port-switching section 115 can be issued and that use of channels at a downstream side can be coordinated according to the supervisory control information (channel busy/idle information) and the spectrum monitoring (measurement) result obtained by the SAU 17.

The optical amplifier 20 simultaneously amplifies the WDM signals received from the OSC beam splitting coupler 19 to compensate for losses caused by light splitting by the OSC beam splitting coupler 19 and the monitor beam splitting coupler 21. The monitor beam splitting coupler 21 splits input from the optical amplifier 20 into two outputs, and then inputs one of these to the SAU 17 to monitor its spectrum. The beam-splitting coupler 22 takes the other one of the outputs (WDM signals) of the monitor beam splitting coupler 21, and separates the WDM signals into channels at separate wavelengths. Here, the separated optical channels are then input to the modulator and port switching section 115.

The SAU 17 monitors the spectrum of transmitting/receiving WDM signals which have been split and directed by the foregoing monitor beam splitting couplers 15 and 21. In the present embodiment, it is possible to realize like functions to those of the SAU 17, even with no use of an expensive optical circuit (PD array). Specifically, as shown in FIG. 1, the SAU 17 of the present embodiment has, as its essential part, a switch 51, a PD 52, an amplifier 53, level peak (peak/bottom) holder circuit 55, an AD converter 56, a CPU 57, and a DA converter 58.

Here, the switch 51 takes two inputs, one from the monitor beam splitting coupler 15; the other, from the monitor beam splitting coupler 21, and it selectively outputs either of them, following an instruction given by the CPU 57. The PD (opto-electric converter section) 52 receives the WDM signals from the switch 51, and then outputs an electric signal corresponding to the optical power of the received WDM signals. The amplifier 53 amplifies the output of the PD 52 to reach a predetermined level.

A filter 54 is a lowpass filter which allows a pilot signal component (chiefly, an AC component) to pass through it, blocking a frequency component (chiefly, a DC component due to amplified spontaneous emission (ASE)), of the output of the amplifier 53, higher than the above-mentioned pilot signal data (hereinafter simply called "pilot signal"). The peak/bottom holder circuit 55 holds a peak and bottom values of the output of the filter 54. The AD converter 56 converts the peak and bottom values (amplitude information) of the pilot signal component, which values are held in the peak/bottom holder circuit 55, into digital form.

That is, the PD 52, the filter 54, and the peak/bottom holder circuit 55 serve as a pilot signal detecting means for detecting a pilot signal in received WDM signals.

The CPU 57 measures the spectrum (OSNR) of input WDM signals in accordance with the thus obtained amplitude information of the pilot signal component (a combination of multiple pilot signal components at separate wavelengths). The CPU 57 can evaluate whether channels are busy or idle, depending upon the detection of the pilot signal component. Moreover, such an evaluation result is notified to the OSC unit 18, thereby making it possible to notify a downstream side of the above-mentioned channel busy/idle information over an OSC, so it is no longer required to monitor pilot signals at every node in the WDM communication system.

That is, the CPU 57 serves both as (1) an evaluating means for evaluating whether each of the plurality of WDM optical channels is busy or idle, based on detection results obtained by the above pilot signal detecting means and as (2) a notifying means (supervisory control information transmitting section) for notifying another WDM communication apparatus in the WDM communication system of the detection results, which have been obtained by the evaluating means, over an OSC which is previously assigned for communicating supervisory control information thereon.

Referring now to FIG. 2, a repeater station 3 of the present embodiment is symmetrically formed for realizing bi-directional communication. For example, assuming that the direction toward the right on FIG. 2 is designated as a transmitting (downstream) direction, while the direction toward the left on FIG. 2 is designated as a receiving (upstream) direction, the repeater station 3 has (1) a transmitter function including an OSC beam-splitting coupler 31; an optical amplifier 32; a monitor beam splitting coupler 33; and an OSC beam-inserting coupler 34, and (2) a receiver function including an OSC beam-splitting coupler 37; an optical amplifier 38; a monitor beam splitting coupler 39; and an OSC beam-inserting coupler 40. Additionally, the repeater station 3 also has (3) a supervisory controller function including an SAU 35 (35a, 35b), and OSC sections 36a and 36b.

Regarding the above transmitter (receiver) function, the OSC beam-splitting coupler 31 (37) splits WDM signals received through an optical transmission path 500 (600) into two outputs, and then inputs one of the outputs to the OSC section 36b (36a), and the other, to the optical amplifier 32 (38). The optical amplifier 32 (38) simultaneously amplifies the WDM signals input from the OSC beam-splitting coupler 31 (37) to compensate for losses which will be caused by light splitting by the monitor beam splitting coupler 33 (39) and the OSC beam-inserting coupler 34 (40), both of which are disposed subsequently to the optical amplifier 32(38). As in the case of the above description, an EDFA (Erbium-doped Fiber Amplifier), for example, is applicable, as the optical amplifier 32(38).

The monitor beam splitting coupler 33 (39) splits the input from the optical amplifier 32 (38) into two outputs, and then inputs one of them to the SAU 35a (35b), and the other, to the OSC beam-inserting coupler 34 (40). The OSC beam-inserting coupler 34 (40) inserts an OSC light beam into the output of the monitor beam splitting coupler 33 (39).

The SAUs 35a and 35b each have a construction similar to that of an SAU 17 of the terminal 1, so that they can monitor the channel busy/idle state of the WDM channels and their spectrum (OSNR) based on the above-mentioned pilot signal component contained in the WDM signals. Note that, since the SAUs 35a and 35b are dedicated to downstream and upstream directions, respectively, there is not provided any equivalent to the switch 51 of the SAU 17 of the terminal 1.

In the foregoing WDM communication system of the present embodiment, the terminal 1 uses an idle WDM channel to transmit pilot signal data (a fixed pattern) unique to the channel, and the pilot signal data is detected by an SAU 17 (35) equipped to a repeater station 3 or to a node, such as an OADM (not shown), located en route. It is thus possible to recognize whether the channels are busy or idle (the channel busy/idle state) of the WDM signals, so that active communication control according to the channel busy/idle state is available.

More specifically, since the OSC notifies another node (OAMD, or the like) of the channel busy/idle state, it becomes possible for the node to use an idle channel to newly establish communication thereover. For example, an OADM node receives notification of the channel busy/idle state, and judges that a channel is idle, based on the notification. Onto that optical channel an optical transmitting means (an add/drop function) of the OADM node superimposes another item of transmission data, to transmit to another WDM communication apparatus.

As a result, effective use of wavelength resources in the WDM communication system is realized, thereby making it possible to reduce congestion due to a momentary upsurge in traffic.

Further, it is also possible to measure the spectrum (OSNR) of WDM signals according to the pilot signal data, thus eliminating the necessity for expensive optical circuitry.

A transponder 11 of a terminal 1 will be described hereinbelow, which transponder 11 copes with pilot signal data.

Figure 3A:
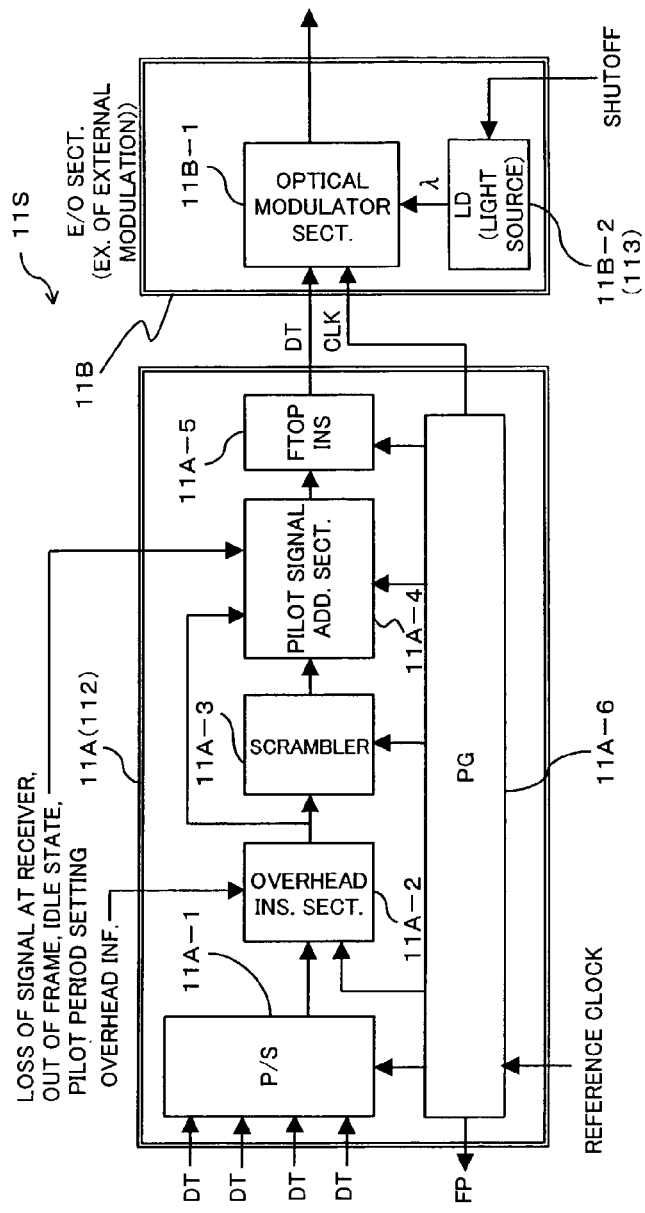
FIG. 3(A) is a block diagram depicting a transponder (transmitter) of FIG. 1 in a first mode.
Figure 4:
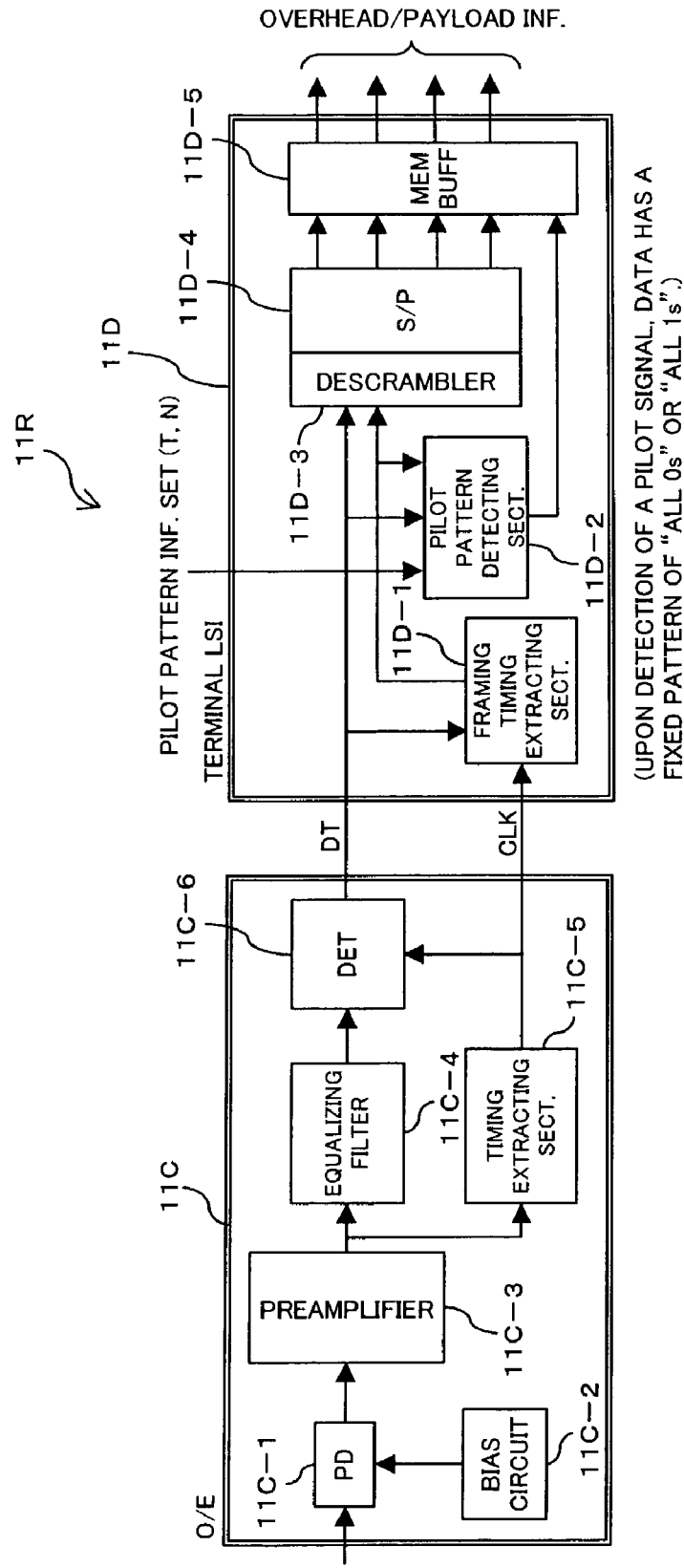
FIG. 4 is a block diagram depicting the transponder (receiver) of FIG. 1 in the first mode.

(A1) First Mode of Transponder 11:

FIG. 3(A) and FIG. 4 each depict a transponder 11 in a first mode. FIG. 3(A) shows a construction of a transmitter of the transponder 11; FIG. 4 shows a construction of a receiver of the transponder 11.

Figure 3B:
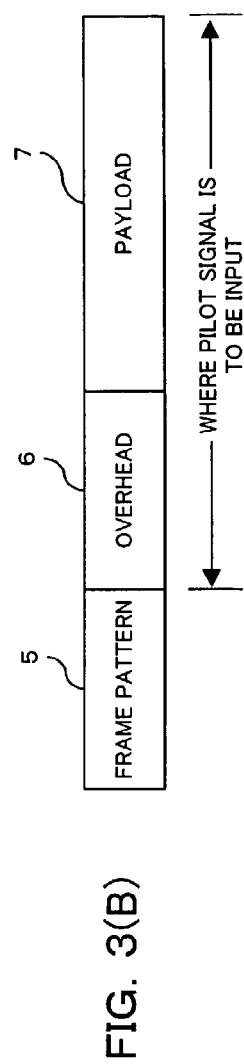
FIG. 3(B) is a view for describing where in a data frame to insert a pilot signal, when the transponder is constructed as in FIG. 3(A)

As shown in FIG. 3(A), the transponder 11 in the first mode has a transmitter 11S. The transmitter 11S has a framing section 11A (equivalent to the foregoing data-framing and pilot-signal-inserting section 112) for generating a data frame which includes a frame pattern 5, an overhead 6, and a payload 7, as shown in FIG. 3(B), and an E/O section 11B for superimposing the data frame, which has been generated by the framing section 11A, on a light signal on a predetermined WDM channel to be wavelength-division multiplexed. The framing section 11A has a parallel/serial (P/S) section 11A-1, an overhead inserting section 11A-2, a scrambler 11A-3, a pilot signal adding section 11A-4, a frame pattern inserting section 11A-5, and a pulse generator (PG) section 11A-6. The E/O section 11B has an optical modulator section 11B-1 and an LD (light source) 11B-2.

Here, the P/S section 11A-1 converts data (parallel data) input through a communication network, such as an ATM network, SONET, a SDH network, and Ethernet™, into serial data. The overhead inserting section 11A-2 adds required overhead information (overhead 6) to the output (payload data) of the P/S section 11A-1. The scrambler 11A-3 simultaneously scrambles the output (overhead 6 plus payload 7) of the overhead inserting section 11A-2.

The pilot signal adding section 11A-4 inserts pilot signal data into a signal (an area composed of overhead 6 and payload 7) which bypasses the scrambler 11A-3, if data to be stored in the payload 7 is absent.

Figure 5:
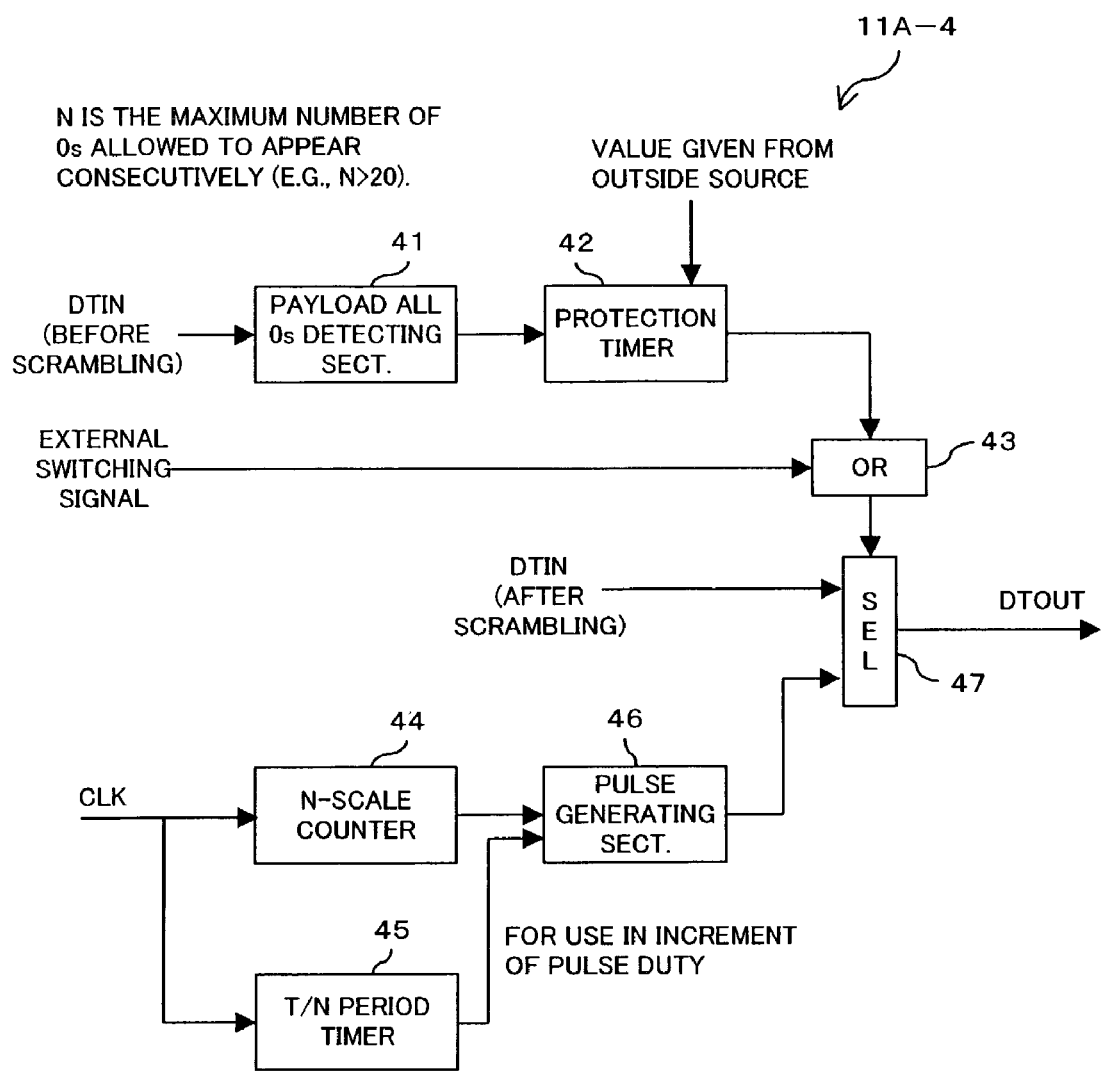
FIG. 5 is a block diagram depicting a pilot signal adding section of FIG. 3(A)

For this purpose, the present pilot signal adding section 11A-4 has, as shown in FIG. 5, a payload ALL 0s detecting section 41, a protection timer 42, an OR circuit 43, a N-scale counter 44, a T/N period timer 45, a pulse generating section 46, and a selector (SEL) 47.

The payload ALL 0s detecting section (verifying means) 41 evaluates whether or not all the payload data bits are 0s (hereinafter called a "payload ALL 0s state") before they undergo scrambling by the scrambler 11A-3, to recognize the absence or existence of data to be transmitted on a WDM optical channel. If the evaluation result obtained by the payload ALL 0s detecting section 41 is positive, a pilot signal, in place of post-scramble data (overhead 6 and payload 7) having been scrambled by the scrambler 11A-3, is selectively output by the selector 47 to the frame pattern inserting section 11A-5. The pilot signal is generated by the N-scale counter 44, the T/N period timer 45 (for use in increment of pulse duty of the pilot signal), and the pulse generating section 46.

Note that N is the maximum number (bit) of 0s allowed to appear consecutively (e.g. N>20); T is a pilot signal period. As shown in FIG. 6, during an idle period in which no valid data is transmitted, a pilot signal with a pattern in which logic inversion occurs every N bits in a pilot signal period T, is inserted in overhead 6 and payload 7.

Further, by varying the pilot signal periods T with the wavelength, it is possible to generate pilot signals which are unique to the individual channels (it is possible to label each channel with a channel-unique pilot signal).

The protection timer 42 is provided not to output a detection signal until a certain number of data 0s are successively detected after the detection of a payload data ALL 0s state by the payload ALL 0s detecting section 41.

The OR circuit 43 ORs output of the protection timer 42 with an external switching signal (an input light interrupt detection signal received from a receiver function of the transponder 11 or an out-of-frame-synchronization signal). With this construction, the selector 47 can selectively output the signal which has been received from the pulse generating section 46, not only when the payload ALL 0s state is detected, but also when the external switching signal is input.

Referring now to FIGS. 3(A) and 3(B), the frame pattern inserting section 11A-5 adds a predetermined frame pattern 5, for use in synchronization, to a signal in which a pilot signal (an area composed of overhead 6 and payload 7) is inserted, and thereby a transmission data frame of FIG. 3(B) is consequently generated. Note that the PG section 11A-6 supplies each of the elements 11A-1 through 11A-5 with a required operation clock, based on an intra-apparatus reference clock.

In the meantime, the optical modulator section 11B-1 of the E/O section 11B modulates light of a predetermined wavelength, which is supplied from the LD 11B-2, with a transmission data frame generated by the framing section 11A according to an operation clock supplied from the PG section 11A-6, thereby generating a transmission light signal.

That is, the aforementioned pilot signal adding section 11A-4 and the E/O section 11B serve as a pilot signal transmitting means. If the payload ALL 0s detecting section 41 detects a payload ALL 0s state on a channel, whereupon it is recognized that data (payload) to be transmitted on the channel is absent, the channel-unique (labeled for each wavelength) pilot signal is transmitted over the optical channel.

Referring now to FIG. 4, a receiver function 11R of a transponder 11 has an O/E section 11C, which converts received light signals from an optical transmission path 600 (more specifically, from the beam-splitting coupler 22 of FIG. 1) into electric form to extract a data frame therefrom, and a terminal LSI 11D for performing required terminating processing, such as descrambling and S/P (serial/parallel) conversion, on the data frame thus obtained by the O/E section 11C.

Thus, the O/E section 11C has a photodiode (PD) 11C-1, a bias circuit 11C-2, a preamplifier 11C-3, an equalizing filter 11C-4, a timing extracting section 11C-5, and a data extracting section 11C-6. The terminal LSI 11D has a frame timing extracting section 11D-1, a pilot pattern detecting section 11D-2, a descrambler 11D-3, an S/P section 11D-4, and a memory (buffer) section 11D-5.

The PD 11C-1 of the O/E section 11C receives light signals on predetermined optical channels through an optical transmission path 600, and converts the received light signals into electronic form. The bias circuit 11C-2 controls a bias applied to the PD 11C-1, and the preamplifier 11C-3 amplifies an electric signal from the PD 11C-1 up to a predetermined signal level.

The equalizing filter 11C-4 equalizes output of the preamplifier 11C-3, and the timing extracting section 11C-5 extracts a reference transmission clock from output of the preamplifier 11C-3. The Data extracting section 11C-6 extracts a data frame from the thus equalized signal output from the equalizing filter 11C-4.

In the meantime, the frame timing extracting section 11D-1 of the terminal LSI 11D extracts a frame timing (the foregoing frame pattern 5) of a received data frame, in accordance with the reference clock extracted by the timing extracting section 11C-5. The pilot pattern detecting section 11D-2 extracts a pilot signal from the data frame, which has been extracted by the Data extracting section 11C-6, in accordance with an operation clock supplied by the frame timing extracting section 11D-1. Note that the pilot pattern detecting section 11D-2 is notified in advance of the maximum number N of 0s allowed to appear consecutively (e.g. N>20) and a pilot signal period T.

The descrambler 11D-3 descrambles the received data frame obtained by the Data extracting section 11C-6, thereby restoring the original data frame. The S/P section 11D-4 performs S/P conversion on output of the descrambler 11D-3, and the memory section 11D-5 temporarily holds output of the S/P section 11D-4. Here, at a time of detection of a pilot signal by the pilot pattern detecting section 11D-2, data is defined to have a fixed pattern of "ALL 0s" or "ALL 1s".

With this construction, the transponder 11 of the present embodiment is allowed to transmit downstream a channel-unique pilot signal over an idle WDM transmission channel, so that it is possible to separate a pilot signal from a received WDM signal input from the downstream side to send out only required data over an ATM network, SONET, an SDH network, or Ethernet™.

In the above-described transponder 11, a pilot signal is inserted, at a time an optical channel is idle, into both of an overhead 6 and a payload 7. Alternatively, the pilot signal may be inserted into either one of those, or otherwise, different pilot signals may be inserted into these two parts, separately.

Moreover, if a pilot signal is inserted into an overhead 6, the pilot signal may be inserted into a part {a transient (undefined) overhead; unused bytes other than those (bytes A1-Z) which are significant to monitor errors} of the overhead 6, not the whole part of it. Various modes of the insertion of such pilot signals will be described hereinbelow.

Figures 7A, 7B:
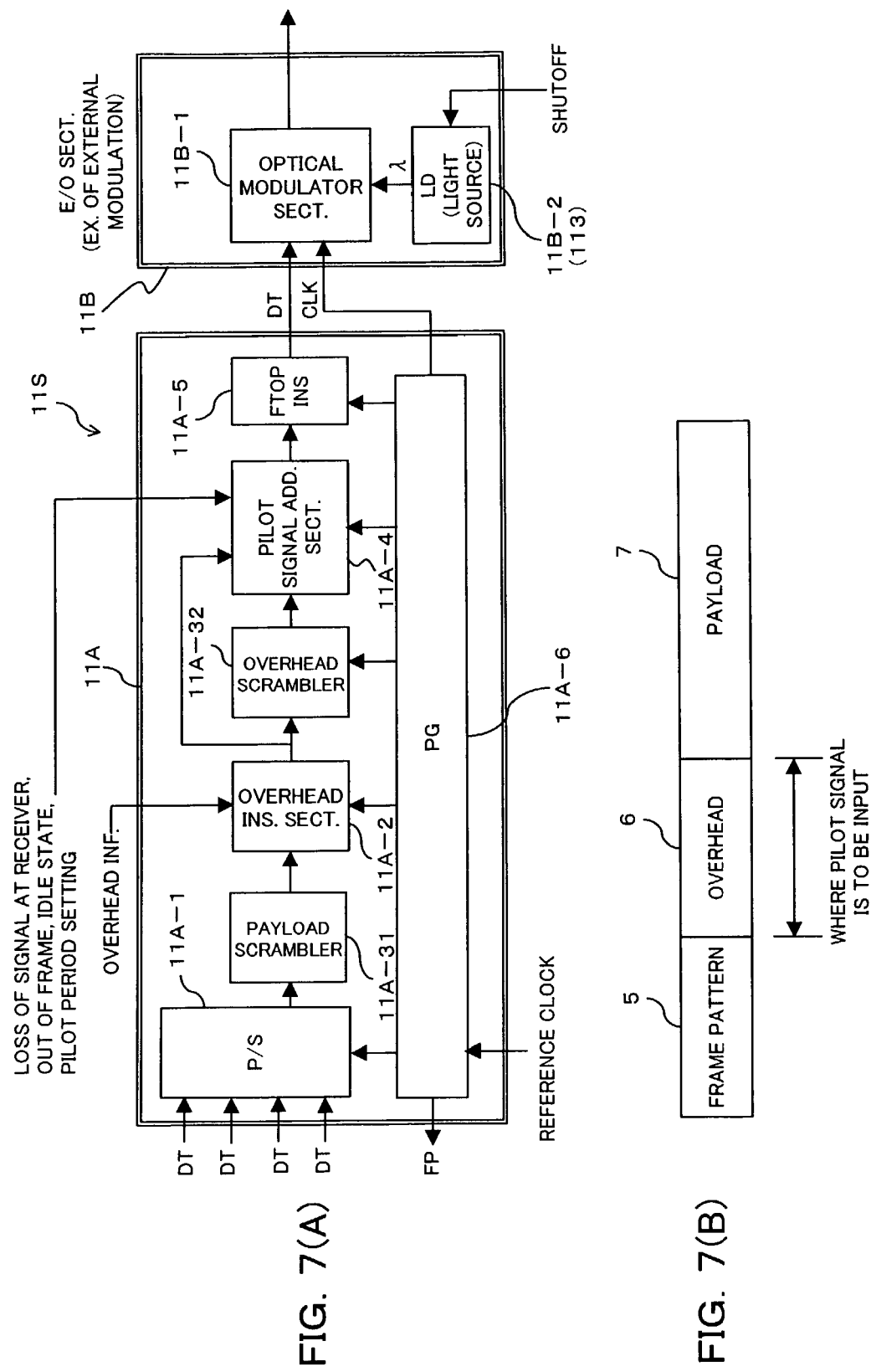
FIG. 7(A) is a block diagram depicting a transponder (transmitter) of FIG. 1 in a second mode.
FIG. 7(B) is a view for describing where in a data frame to insert a pilot signal, when the transponder is constructed as in FIG. 7(A)
Figure 8:
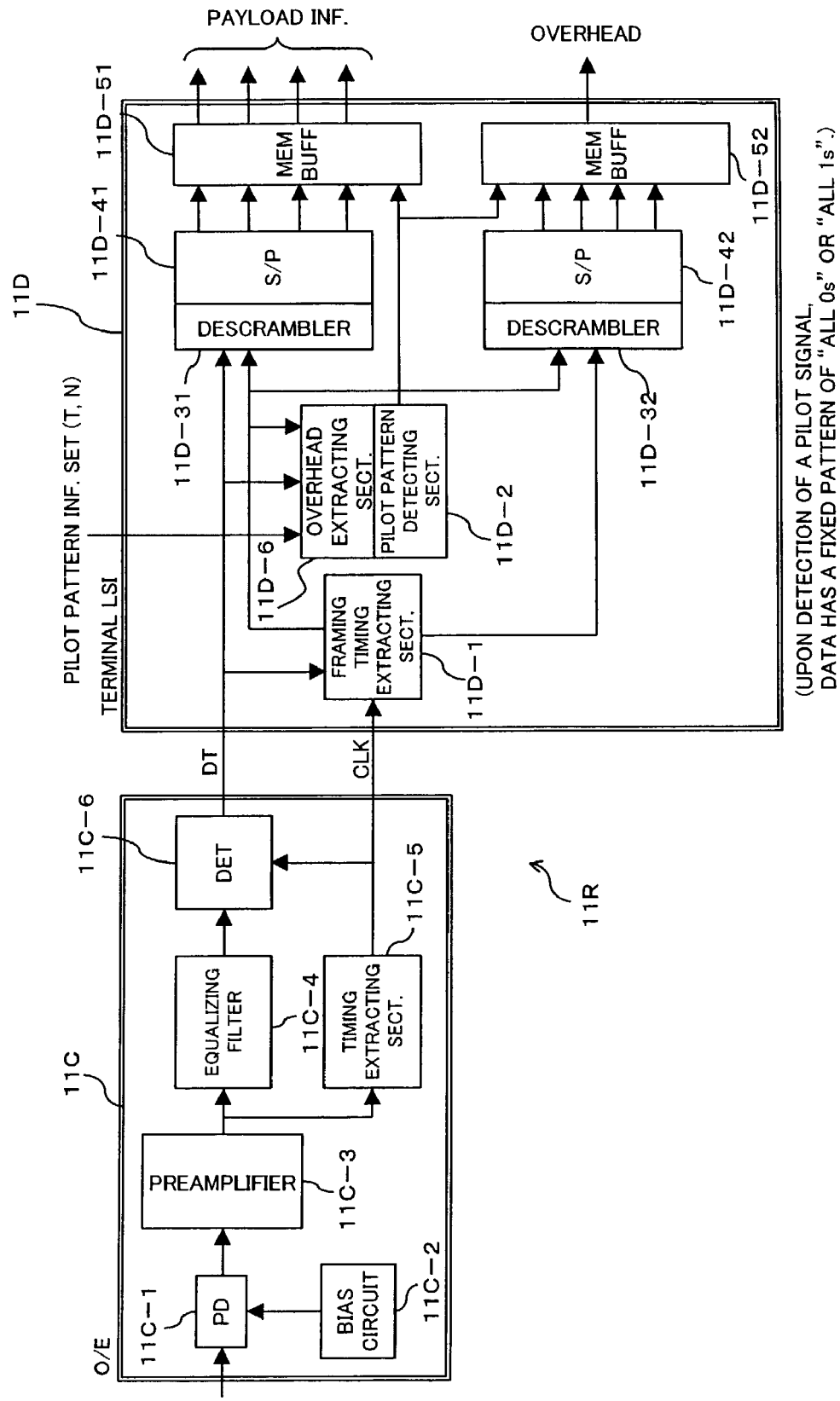
FIG. 8 is a block diagram depicting the transponder (receiver) of FIG. 1 in the second mode.

(A2) Second Mode of Transponder 11—Pilot Signal is Inserted into an Overhead Alone:

FIG. 7(A) and FIG. 8 show a transponder 11 in a second mode, where a pilot signal is inserted into an overhead alone. FIG. 7(A) depicts a construction of a transmitter 11S of the transponder 11; FIG. 8 depicts a construction of a receiver 11R of the transponder 11 of FIG. 8.

Referring now to FIG. 7(A), the transmitter 11S of the second mode has a payload scrambler 11A-31 anterior to an overhead inserting section 11A-2 and an overhead scrambler 11A-32 posterior to the overhead inserting section 11A-2, in order to insert a pilot signal into only an overhead 6. With this construction, it is possible to scramble input data separately for the payload 7 (hereinafter also called payload data 7) and the overhead 6 (hereinafter also called overhead information 6).

More precisely, when transmission data is present, the payload scrambler 11A-31 scrambles transmission payload data 7. After that, the overhead inserting section 11A-2 adds required overhead information 6 to the scrambled payload data 7. The overhead scrambler 11A-32 then scrambles the overhead information 6, and the pilot signal adding section 11A-4 lets the resulting data pass therethrough. Finally, the frame pattern inserting section 11A-5 adds a frame pattern 5 to the output, thereby generating a transmission data frame.

Otherwise, if transmission data is absent(idle), the transmission payload data 7 (no data) is input to the overhead inserting section 11A-2 via the payload scrambler 11A-3, and then passes through the overhead inserting section 11A-2. The data bypasses the overhead scrambler 11A-32 into the pilot signal adding section 11A-4, whereupon a pilot signal, instead of overhead information 6, is inserted into the payload data 7 (see FIG. 7(B)). Other operations than the above-described are similar to those of the transmitter 11S, as was already described with reference to FIG. 3(A).

Referring now to FIG. 8, in adaptation to the insertion of a pilot signal into the overhead 6 alone, the terminal LSI 11D of the receiver 11R is equipped with an overhead extracting section 11D-6. In addition, in order to make it possible to perform descrambling, S/P conversion, and various buffer processing for the payload data 7 and the overhead information 6 separately, the terminal LSI 11D also has the following: a descrambler 11D-31 dedicated to the payload data 7; an S/P section 11D-41; a memory (buffer) section 11D-51; a descrambler 11D-32 dedicated to the overhead 6; an S/P section 11D-42; and a memory (buffer) section 11D-52. Here, the other part of the construction than the above is similar to or the same as that shown in FIG. 3(A).

In the receiver 11R, the overhead extracting section 11D-6 extracts overhead information 6 from a data frame obtained by the O/E section 11C, and the descrambler 11D-32 descrambles the extracted overhead information. The S/P section 11D-42 performs P/S conversion on the converted overhead information 6, and then stores the overhead information 6 in the memory section 11D-52 temporarily. Meanwhile, the descrambler 11D-31 descrambles the remaining payload data 7, and the S/P section 11D-41 performs P/S conversion on the converted payload data 7, and then stores the payload data 7 in the memory section 11D-51 temporarily.

If the pilot pattern detecting section 11D-2 detects a pilot signal in the overhead 6, which has been extracted by the overhead extracting section 11D-6, the memories 11D-51 and 11D-52 each store a bit pattern of ALL 0s or ALL 1s.

In such a manner, in a case where a pilot signal is inserted into only an overhead 6, descrambling, S/P conversion, and various kinds of buffer processing are carried out separately on an overhead 6 and a payload 7, so that normal signal receiving processing is available.

Figure 10:
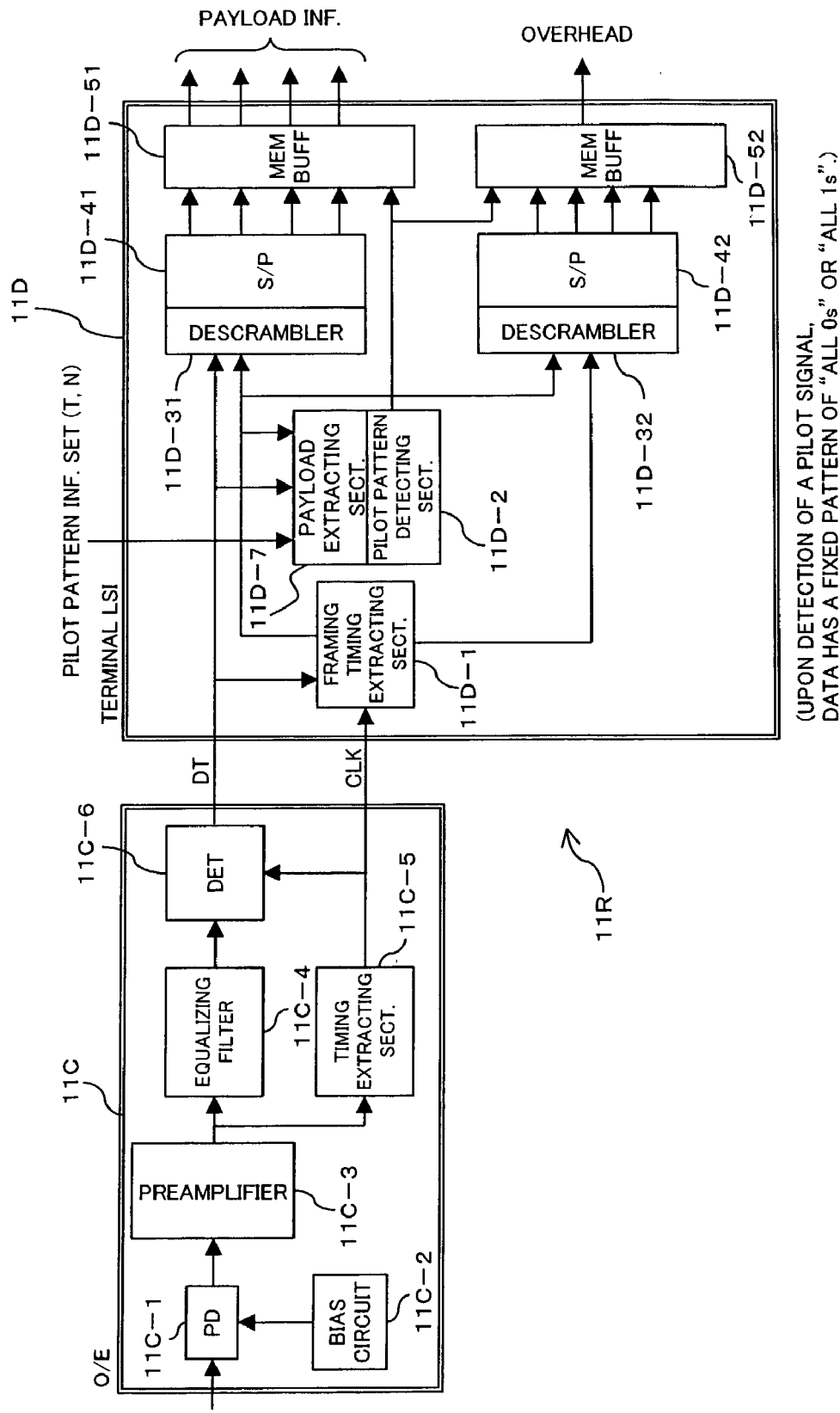
FIG. 10 is a block diagram depicting the transponder (receiver) of FIG. 1 in the third mode.

(A3) Third Mode of Transponder 11—Pilot Signal is Inserted into a Payload Alone:

FIG. 9(A) and FIG. 10 show a transponder 11 in a third mode, where a pilot signal is inserted into only a payload 7 (see FIG. 9(B)). FIG. 9(A) depicts a construction of a transmitter 11S of the transponder 11; FIG. 10 depicts a construction of a receiver 11R of the transponder 11.

Referring now to FIG. 9(A), the transmitter 11S of the third mode has a payload scrambler 11A-31 anterior to a pilot signal adding section 11A-4 and an overhead scrambler 11A-32 posterior to an overhead inserting section 11A-2, in order to insert a pilot signal into only a payload 7. With this construction, it is possible to scramble input data separately for payload data 7 and overhead information 6).

More precisely, when transmission data is present, the payload scrambler 11A-31 scrambles transmission payload data 7. The scrambled payload data 7 passes through the pilot signal adding section 11A-4, and then enters the overhead inserting section 11A-2. After that, the overhead inserting section 11A-2 adds required overhead information 6 to the scrambled payload data 7, which overhead information 6 is then scrambled by the overhead scrambler 11A-32. To the scrambled result, a frame pattern 5 is added by the frame pattern inserting section 11A-5.

Otherwise, if transmission data is absent, output of the P/S section 11A-1 bypasses the payload scrambler 11A-3 into the pilot signal adding section 11A-4, which then inserts a pilot signal, instead of payload data 7, into the output. After that, the overhead inserting section 11A-2 adds overhead information 6 to the output, which overhead information 6 is then scrambled by the overhead scrambler 11A-32. The frame pattern inserting section 11A-5 then adds a frame pattern 5 to the output, thereby generating a transmission frame containing the pilot signal in its payload 7. Other operations than the above-described are basically similar to those of the transmitter 11S, as was already described with reference to FIG. 3(A) and FIG. 7(A).

Referring now to FIG. 10, in adaptation to the insertion of a pilot signal into the payload 7 alone, the receiver 11R is equipped with a payload extracting section 11D-7, instead of an overhead extracting section 11D-6 of FIG. 8. The payload extracting section 11D-7 extracts a payload 7 from output of the data extracting section 11C-6.

In this case, if a pilot pattern detecting section 11D-2 detects a pilot signal in the payload 7 which has been extracted by the payload extracting section 11D-7, only a memory section 11D-51 dedicated to a payload 7 holds a fixed bit pattern of ALL 0s or ALL 1s. Other operations than the above-described are similar to those depicted in FIG. 8. With this construction, even in a case where a pilot signal is inserted into a payload 7 alone, normal signal receiving processing is available.

Figures 11A, 11B:
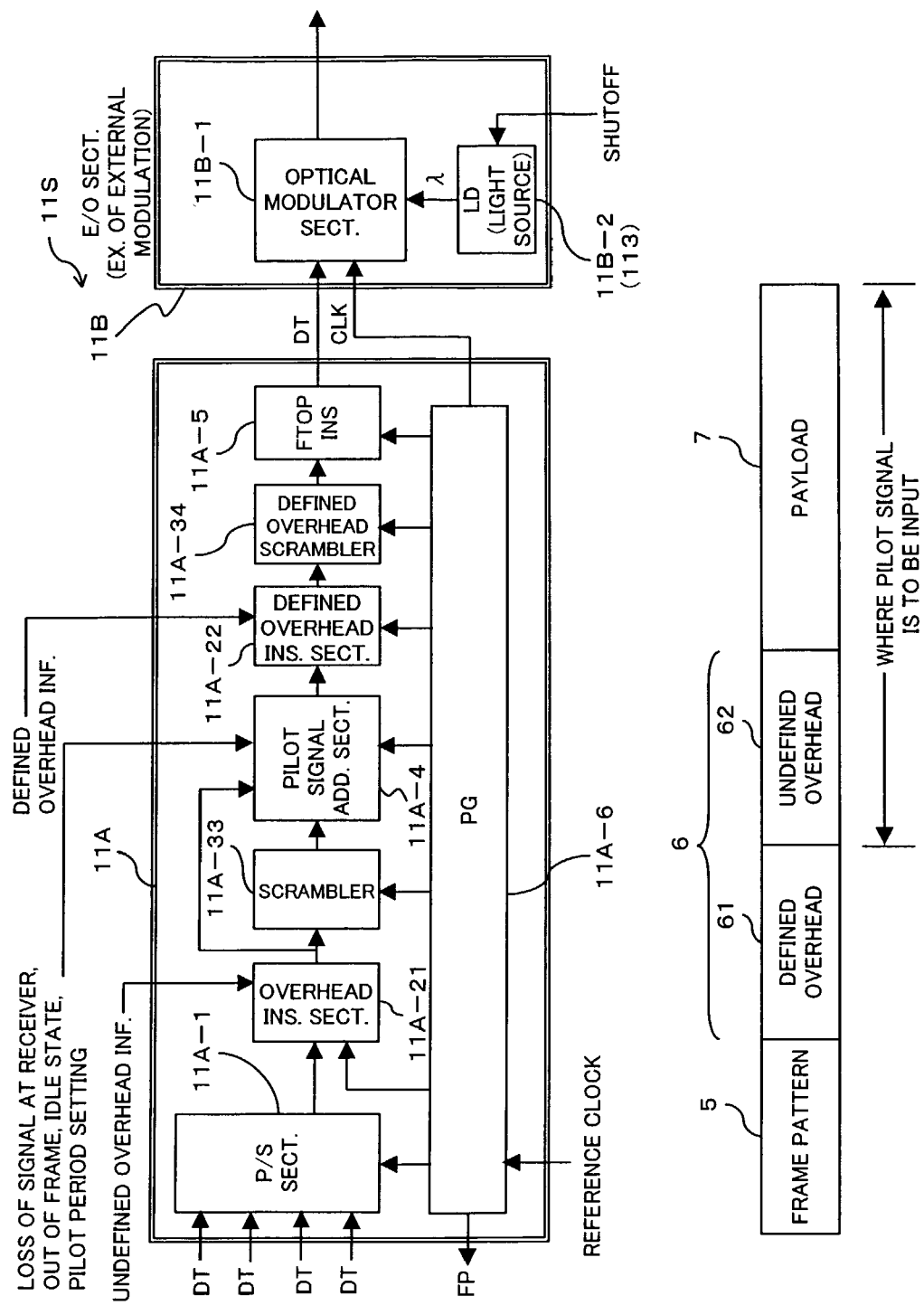
FIG. 11(A) is a block diagram depicting a transponder (transmitter) of FIG. 1 in a fourth mode.
FIG. 11(B) is a view for describing where in a data frame to insert a pilot signal, when the transponder is constructed as in FIG. 11(A)
Figure 12:
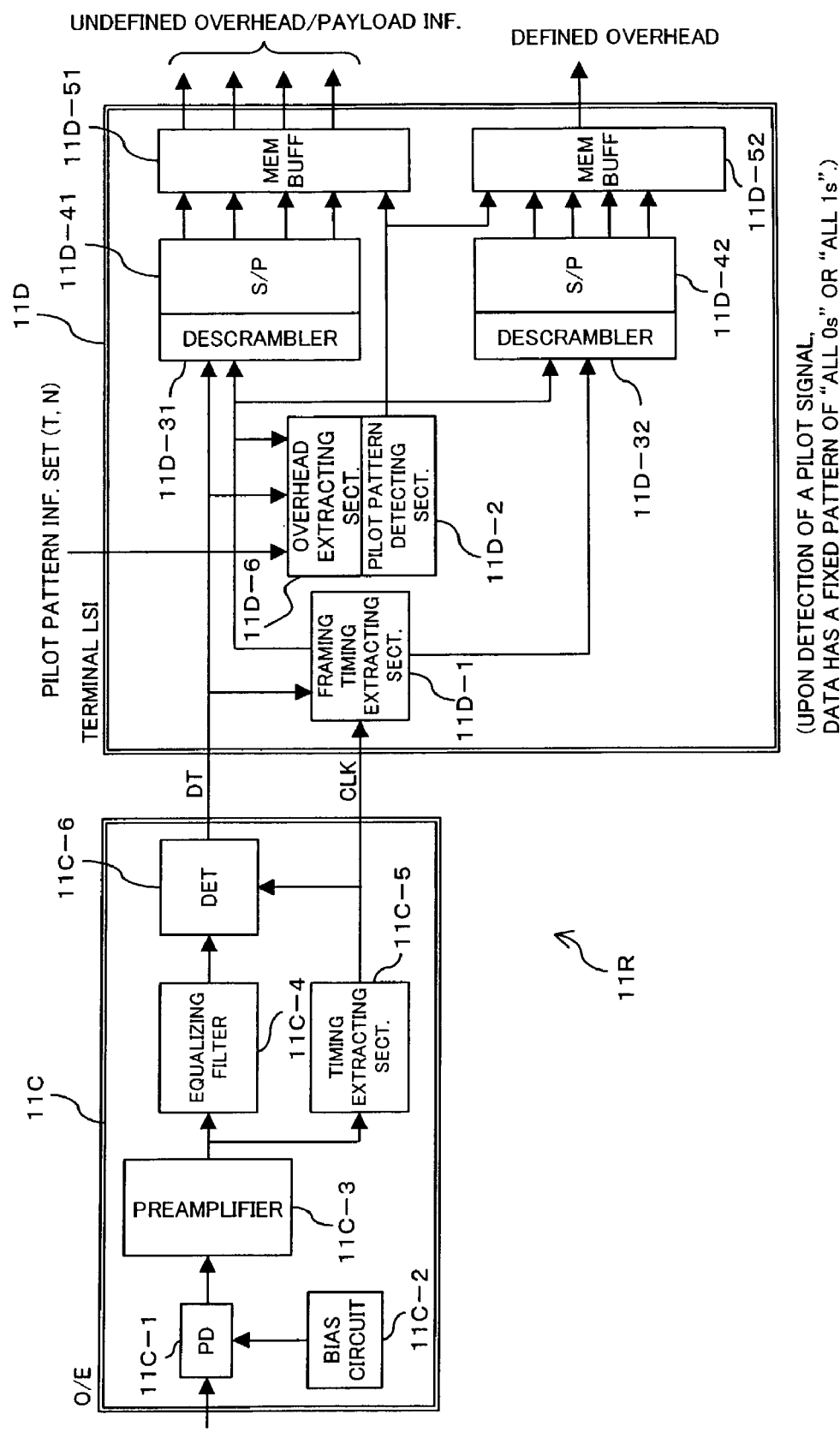
FIG. 12 is a block diagram depicting the transponder (receiver) of FIG. 1 in the fourth mode.

(A4) Fourth Mode of Transponder 11—Pilot Signal is Inserted into a Payload and Part (an Undefined, or Transient, Overhead) of an Overhead Information 6:

FIG. 11(A) and FIG. 12 show a transponder 11 in a fourth mode, where a pilot signal is inserted into both a transient (or undefined) overhead 62 (see FIG. 11(B)) and a payload 7. FIG. 11(A) depicts a construction of a transmitter 11S of the transponder 11; FIG. 12 depicts a construction of a receiver 11R of the transponder 11. In FIGS. 11, (A) and (B), and FIG. 12, like reference numbers to those that have already been described designate similar parts or elements, so their detailed description is omitted here.

Referring now to FIG. 11(A), the transmitter 11S of the fourth mode includes: an undefined overhead inserting section 11A-21 disposed between a P/S section 11A-1 and an undefined overhead scrambler 11A-33; a defined overhead inserting section 11A-22 disposed between a pilot signal adding section 11A-4 and defined overhead scrambler 11A-34, so that a pilot signal is inserted into an undefined overhead 62 and a payload 7. With these scramblers, 11A-33 and 11A-34, it is possible to scramble input data separately for payload data 7 and for information (hereinafter called "undefined overhead information 62") to be stored in the undefined overhead 62.

Note that the defined overhead information 61, as was already described above, represents bytes (A1-Z) which are significant to monitor errors, and that the undefined overhead information 62 represents the other remaining unused bytes.

If transmission data is absent, output of the P/S section 11A-1 of the transmitter 11S in the fourth mode passes through the undefined overhead inserting section 11A-21, and then the output bypasses the undefined overhead scrambler 11A-33 into the pilot signal adding section 11A-4, where a pilot signal is added in place of the undefined overhead information 62 and the payload data 7.

After that, the defined overhead inserting section 11A-22 adds defined overhead information 61 to the output of the pilot signal adding section 11A-4, which information 61 is then scrambled by the defined overhead scrambler 11A-34. Finally, the frame pattern inserting section 11A-5 adds a frame pattern 5 to the output, thereby generating a transmission data frame with an undefined overhead 62 and a payload 7 both containing a pilot signal.

Otherwise, if transmission data is present, the undefined overhead inserting section 11A-21 adds undefined overhead information 62 to payload data 7. The data enters, instead of bypassing, the undefined overhead scrambler 11A-33, where the input data is scrambled. After that, the output of the undefined overhead scrambler 11A-33 passes through the pilot signal adding section 11A-4, and is then input to the defined overhead inserting section 11A-22.

Then the defined overhead inserting section 11A-22 adds defined overhead information 61 to the input, which is then scrambled by the defined overhead scrambler 11A-34. Finally, a frame pattern inserting section 11A-5 adds a frame pattern 5 to the input, thereby generating a transmission data frame.

Here, other operations than the above-described are basically similar to those of the transmitter 11S, as was already described with reference to FIG. 3(A), FIG. 7(A), and FIG. 9(A).

Referring now to FIG. 12, in adaptation to the insertion of a pilot signal into the undefined overhead 62 and the payload data 7, the receiver 11R has a construction similar to that which is depicted in FIG. 10. In this case, however, the overhead extracting section 11D-6 is allowed to extract a defined overhead 61 and undefined overhead 62 separately. The defined overhead information 61 and the undefined overhead information 62 are then output to a descrambler 11D-32 and a descrambler 11D-31, respectively.

If a pilot pattern detecting section 11D-2 detects a pilot signal, each of the memory sections 11D-51 and 11D-52 holds a fixed bit pattern of ALL 0s or ALL 1s. Other operations than the above-described are similar to those of the receiver 11R depicted in FIG. 10. With this construction, even in a case where a pilot signal is inserted into an undefined overhead information 62 and a payload 7, normal signal receiving processing is still available.

Figures 13A, 13B:
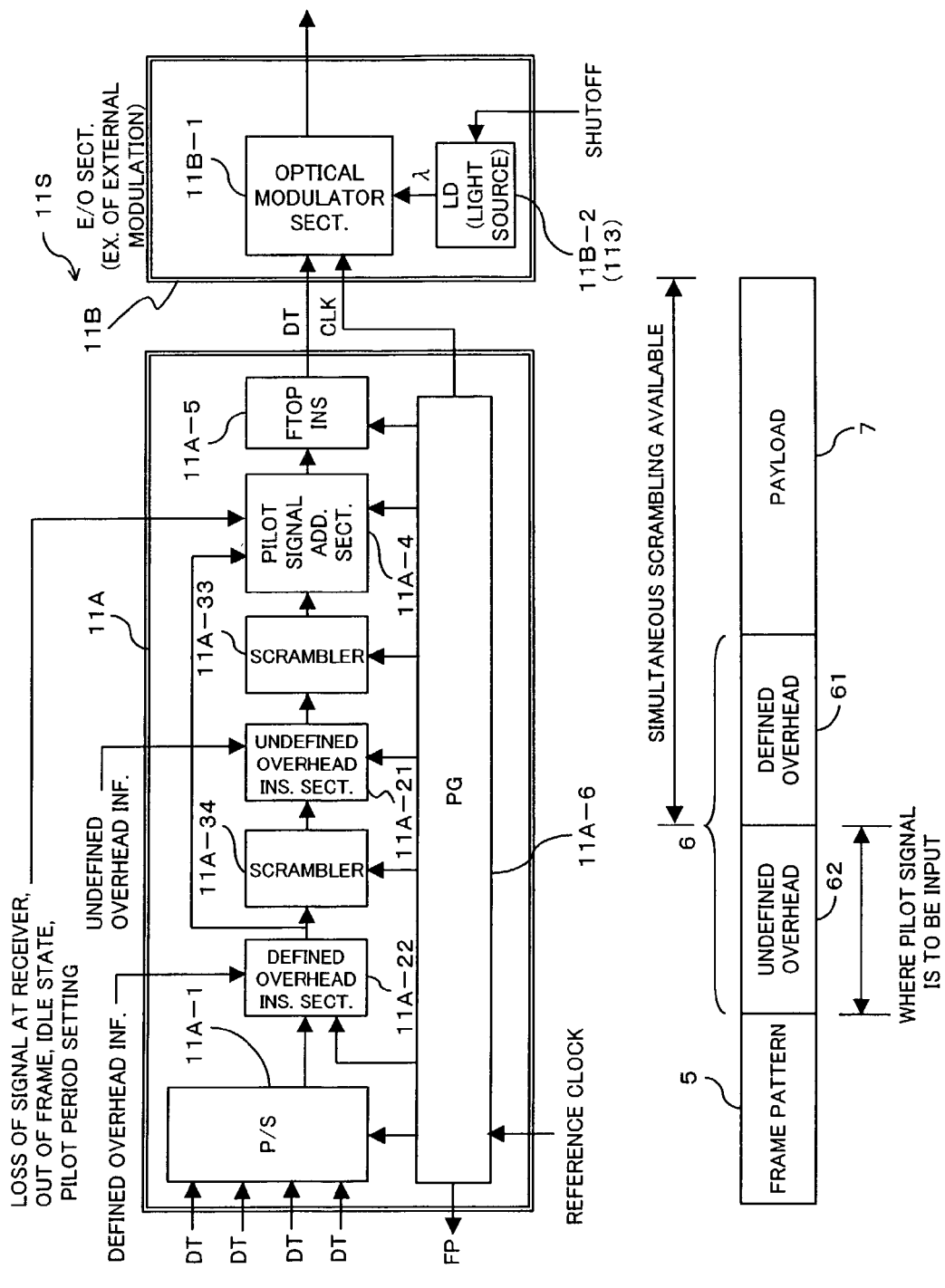
FIG. 13(A) is a block diagram depicting a transponder (transmitter) of FIG. 1 in a fifth mode.
FIG. 13(B) is a view for describing where in a data frame to insert a pilot signal, when the transponder is constructed as in FIG. 13(A)

(A5) Fifth Mode of Transponder 11—Pilot Signal is Inserted into a Payload and Part (an Undefined, or Transient, Overhead) of an Overhead 6:

FIG. 13(A) shows a transponder 11 in a fifth mode, where a pilot signal is inserted into a defined overhead 61 and an undefined overhead 62 (see FIG. 13(B)). FIG. 13(A) depicts a construction of a transmitter 11S of the transponder 11. In FIG. 13(A), like reference numbers to those which have already been described designate similar parts or elements, so their detailed description is omitted here.

Referring now to FIG. 13(B), in order to insert a pilot signal into defined overhead information 61 and undefined overhead information 62, there are arranged, between a P/S section 11A-1 and a frame pattern inserting section 11A-5, a defined overhead inserting section 11A-22, a defined overhead scrambler 11A-34, an undefined overhead inserting section 11A-21, an undefined overhead scrambler 11A-33, and a pilot signal adding section 11A-4, in this cited sequence. With no data transmitted on a channel, output of the defined overhead inserting section 11A-22 is bypassed into the pilot signal adding section 11A-4.

If transmission data is absent, output of the P/S section 11A-1 of the transmitter 11S passes through the defined overhead inserting section 11A-22, and then the output bypasses the defined overhead scrambler 11A-34 into the pilot signal adding section 11A-4, where a pilot signal is added in place of the undefined overhead information 62. Finally, the frame pattern inserting section 11A-5 adds a frame pattern 5 to the input, thereby generating a transmission data frame with an undefined overhead 62 containing a pilot signal.

Otherwise, if transmission data is present, the payload data 7 does not take the foregoing bypass route but the following. The defined overhead inserting section 11A-22 adds defined overhead information 61 to the payload data 7. The data then enters the defined overhead scrambler 11A-34, where both the defined overhead information 61 and the payload data 7 are collectively scrambled. The output of the defined overhead scrambler 11A-34 then enters the undefined overhead inserting section 11A-21, where undefined overhead information 62 is added thereto.

After that, the output (data composed of the undefined overhead information 62, the defined overhead information 61, and the payload data 7) of the undefined overhead inserting section 11A-21 is input to the undefined overhead scrambler 11A-33, where the undefined overhead information 62 is scrambled. The output passes through the pilot signal adding section 11A-4, and is then input into the defined overhead inserting section 11A-22. Finally, the frame pattern inserting section 11A-5 adds a frame pattern 5 to the input, thereby generating a transmission data frame. Other operations than the above-described are basically similar to those of the transmitter 11S, as was already described with reference to FIG. 3(A), FIG. 7(A), FIG. 9(A), and FIG. 11(A).

Here, the construction and the operations of a receiver 11R are similar to those in the fourth mode (see FIG. 12), so their detailed description is omitted here.

Figures 14A, 14B:
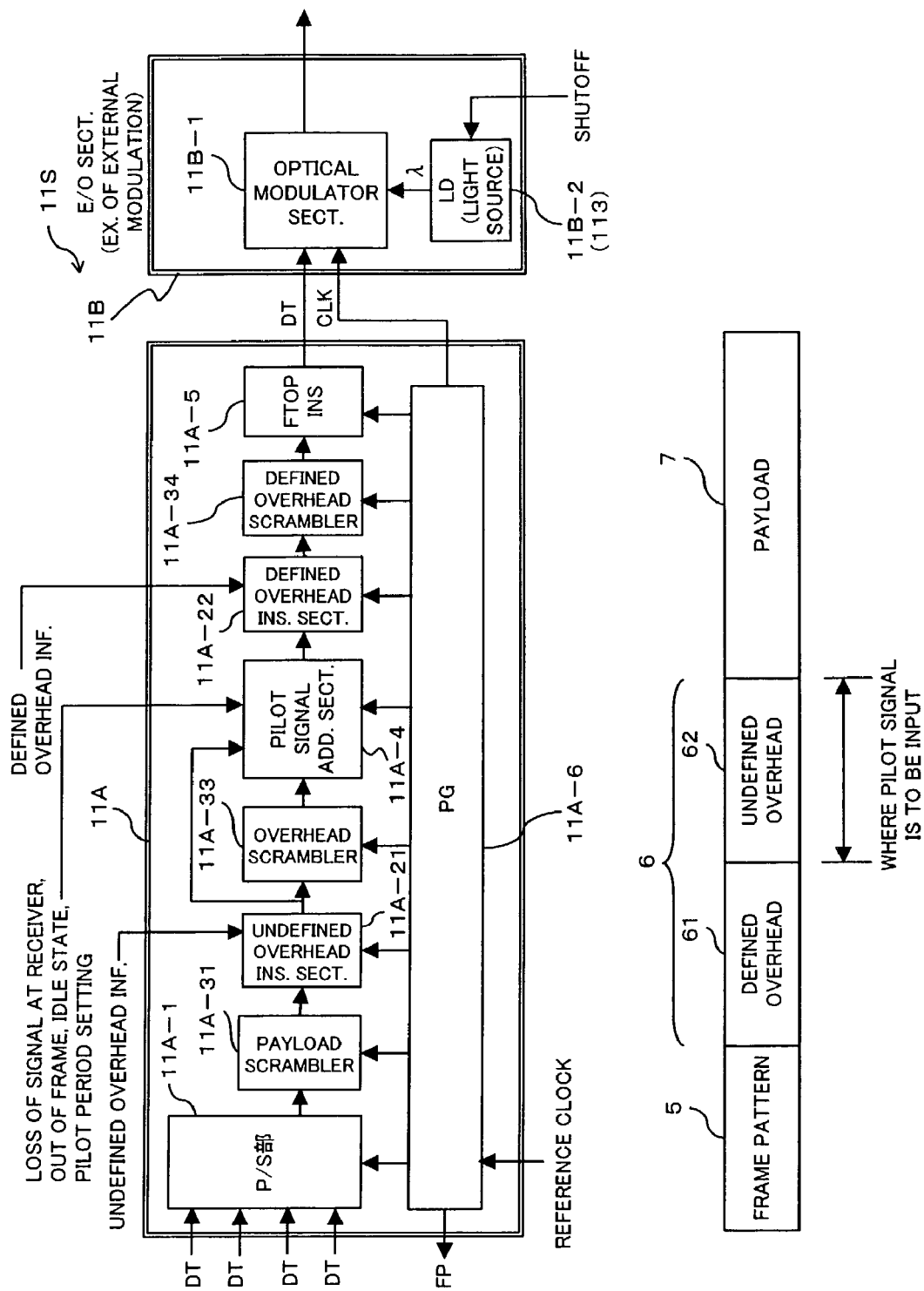
FIG. 14(A) is a block diagram depicting a transponder (transmitter) of FIG. 1 in a sixth mode.
FIG. 14(B) is a view for describing where in a data frame to insert a pilot signal, when the transponder is constructed as in FIG. 14(A)
Figure 15:
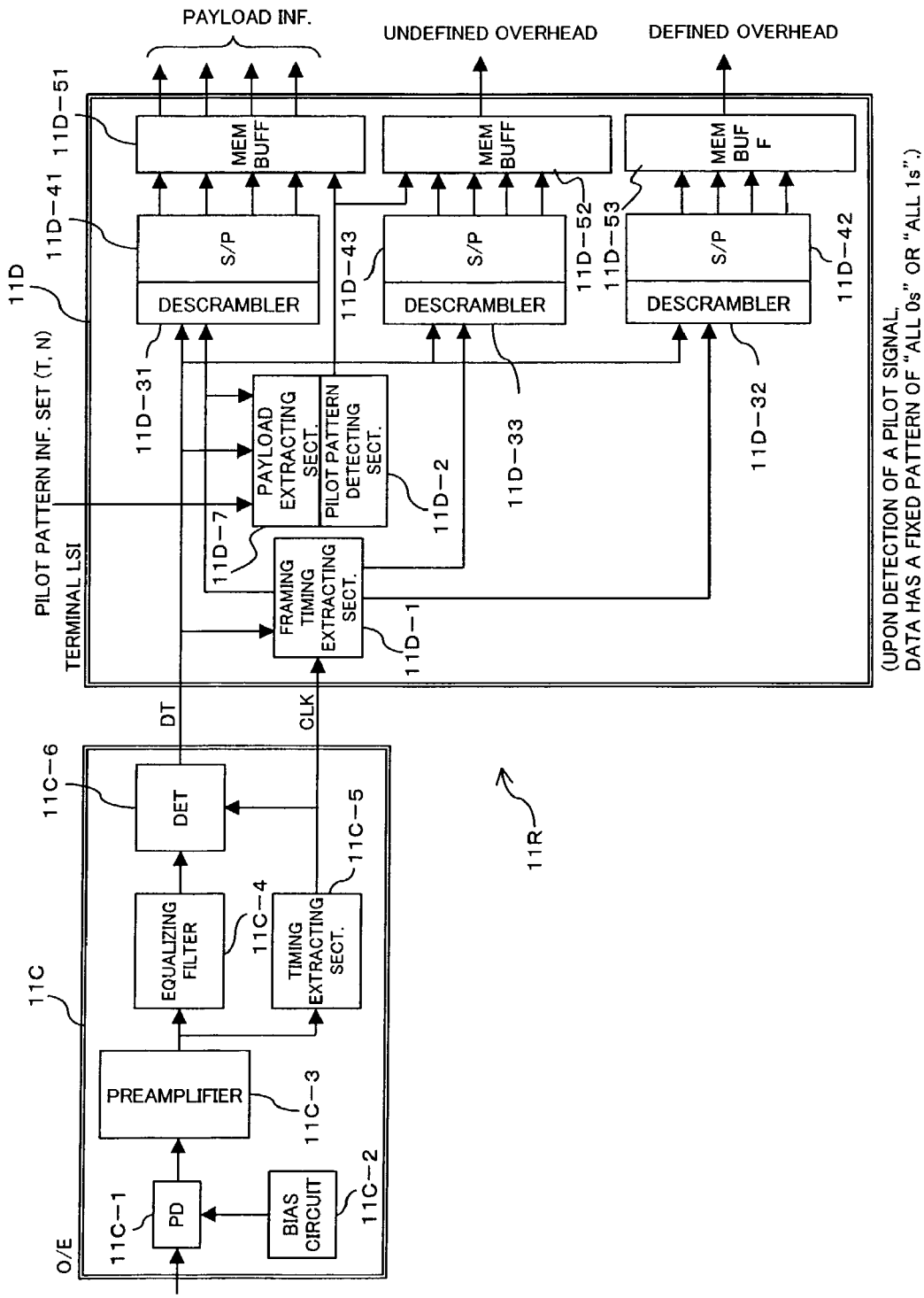
FIG. 15 is a block diagram depicting the transponder (receiver) of FIG. 1 in the sixth mode.

(A6) Sixth Mode of Transponder 11—Pilot Signal is Inserted into an Undefined Overhead Alone:

FIG. 14(A) and FIG. 15 show a transponder 11 in a sixth mode, where a pilot signal is inserted into an undefined overhead 62 (see FIG. 14(B)). FIG. 14(A) depicts a construction of a transmitter 11S of the transponder 11; FIG. 15 depicts a construction of a receiver 11R of the transponder 11. In FIG. 14(A) and FIG. 15, like reference numbers to those which have already been described designate similar parts or elements, so their detailed description is omitted here.

Referring now to FIG. 14(B), in order to insert a pilot signal into only an undefined overhead information 62 of an overhead information 6, there are arranged, between a P/S section 11A-1 and a frame pattern inserting section 11A-5, a payload scrambler 11A-31, an undefined overhead inserting section 11A-21, an undefined overhead scrambler 11A-33, a pilot signal adding section 11A-4, a defined overhead inserting section 11A-22, and a defined overhead scrambler 11A-34, in this cited sequence. With no data transmitted on a channel, output of the P/S section 11A-1 is bypassed into the pilot signal adding section 11A-4.

If transmission data is absent, output of the P/S section 11A-1 of the transmitter 11S is bypassed into the pilot signal adding section 11A-4, where a pilot signal, instead of undefined overhead information 62, is inserted into the input. The output of the pilot signal adding section 11A-4 then enters the defined overhead inserting section 11A-22, where defined overhead information 61 is added to the input.

After that, the output of the defined overhead inserting section 11A-22 enters the defined overhead scrambler 11A-34, where the defined overhead information 61 is scrambled. Finally, the frame pattern inserting section 11A-5 adds a frame pattern 5 to the input, thereby generating a transmission data frame with an undefined overhead 62 containing a pilot signal.

Otherwise, if transmission data is present, the payload data 7 does not take the foregoing bypass route but the following. After the payload scrambler 11A-31 scrambles the payload data 7, the undefined overhead inserting section 11A-21 adds undefined overhead information 62 to the scrambled data. The undefined overhead scrambler 11A-33 scrambles the undefined overhead information 62.

After being scrambled, the data passes through the pilot signal adding section 11A-4, and then enters the defined overhead inserting section 11A-22, where the defined overhead information 61 is added to the input data. After that, the data is input to the defined overhead scrambler 11A-34, where the added defined overhead information 61 is scrambled. Finally, the frame pattern inserting section 11A-5 adds a frame pattern 5 to the data, thereby generating a transmission data frame. Other operations than the above-described are basically similar to those of the transmitter 11S, as was already described with reference to FIG. 3(A), FIG. 7(A), FIG. 9(A), FIG. 11(A), and FIG. 13(A).

Referring now to FIG. 14(B), in adaptation to the insertion of a pilot signal into the undefined overhead 62 of an overhead 6, a terminal LSI 11D of the receiver 11R includes a payload extracting section 11D-7 for extracting payload data 7. Further, in order to perform descrambling, S/P conversion, and various kinds of buffer processing for defined overhead information 61, undefined overhead information 62, and payload data 7, separately, the terminal LSI 11D has a descrambler 11D-31, an S/P section 11D-41, and a memory (buffer) section 11D-51, each of which is dedicated to payload data 7. Further, the terminal LSI 11D also has a descrambler 11D-32, an S/P section 11D-42, and a memory (buffer) section 11D-52, each of which is dedicated to defined overhead information 61. Still further, the terminal LSI 11D has a descrambler 11D-33, an S/P section 11D-43, and a memory (buffer) section 11D-53, each of which is dedicated to undefined overhead information 62. Construction other than the above-described is similar to or the same as that shown in FIG. 3(A).

With this construction, in the receiver 11R of the sixth mode, the payload extracting section 11D-7 extracts payload data 7 from a data frame obtained by an O/E section 11C, and the extracted payload data 7 is then descrambled by the descrambler 11D-31. The descrambled output undergoes S/P conversion carried out by the S/P section 11D-41, and is then temporarily stored in the memory section 11D-51.

In the meantime, the remaining defined overhead information 61 and undefined overhead information 62 are input to the descramblers 11D-32 and 11D-33, respectively, where the information, 61 and 62, is then descrambled. After that, the outputs of the descramblers 61 and 62 are S/P converted by the S/P sections 11D-42 and 11D-43, respectively, and are then temporarily stored in the memory sections 11D-52 and 11D-53, respectively.

After that, if the pilot pattern detecting section 11D-2 detects a pilot signal in the undefined overhead information 62, each of the memories holds a fixed bit pattern of ALL "0s" or ALL "1s".

With such a construction, even in a case where a pilot signal is inserted into the undefined overhead 62, it is possible to carry out descrambling, S/P conversion, and various kinds of buffer processing for the defined overhead 61, the undefined overhead information 62, and the payload 7, separately, so that normal signal receiving processing is available.

Figures 16A, 16B:
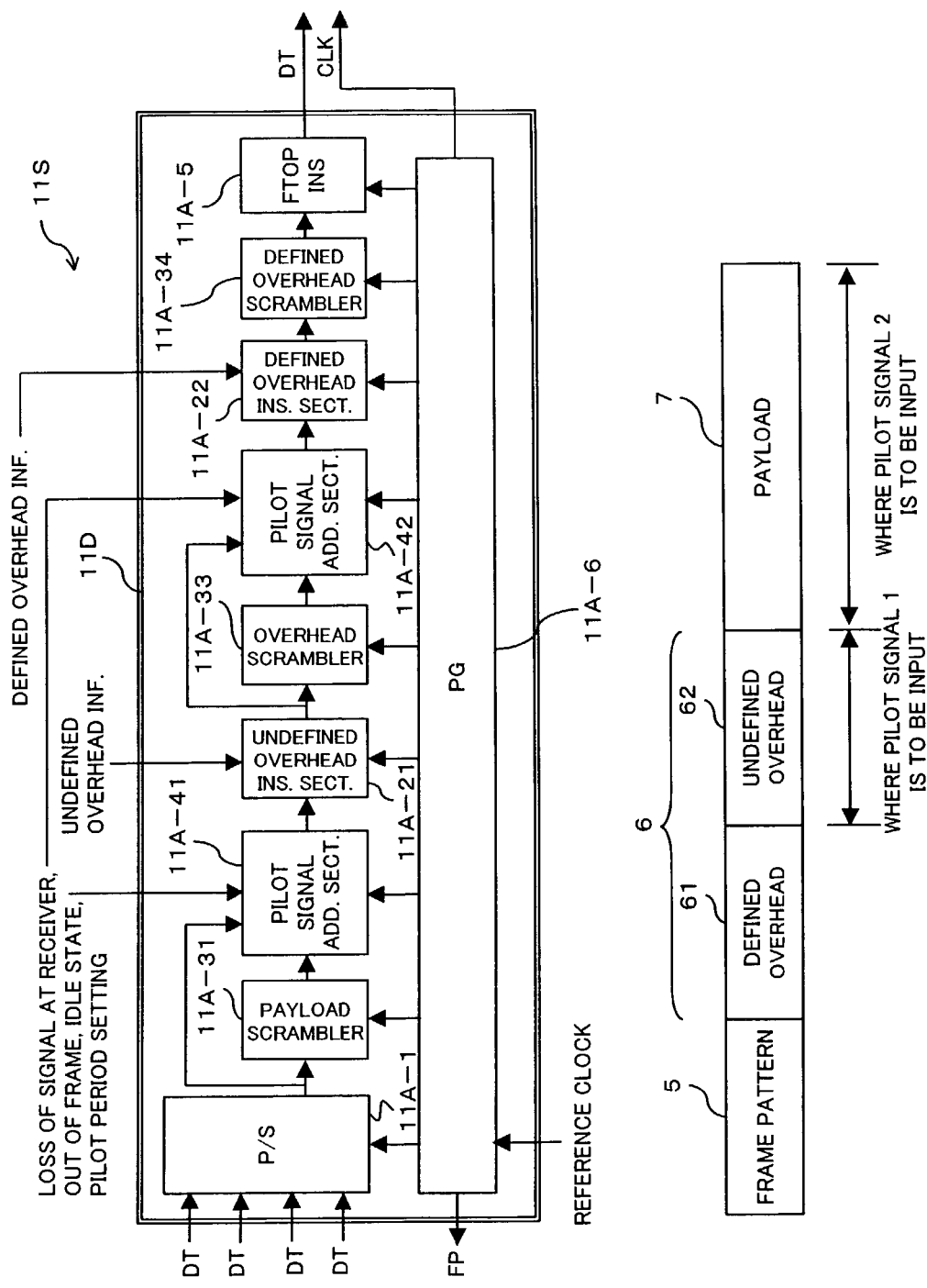
FIG. 16(A) is a block diagram depicting a transponder (transmitter) of FIG. 1 in a seventh mode.
FIG. 16(B) is a view for describing where in a data frame to insert a pilot signal, when the transponder is constructed as in FIG. 16(A)
Figure 17:
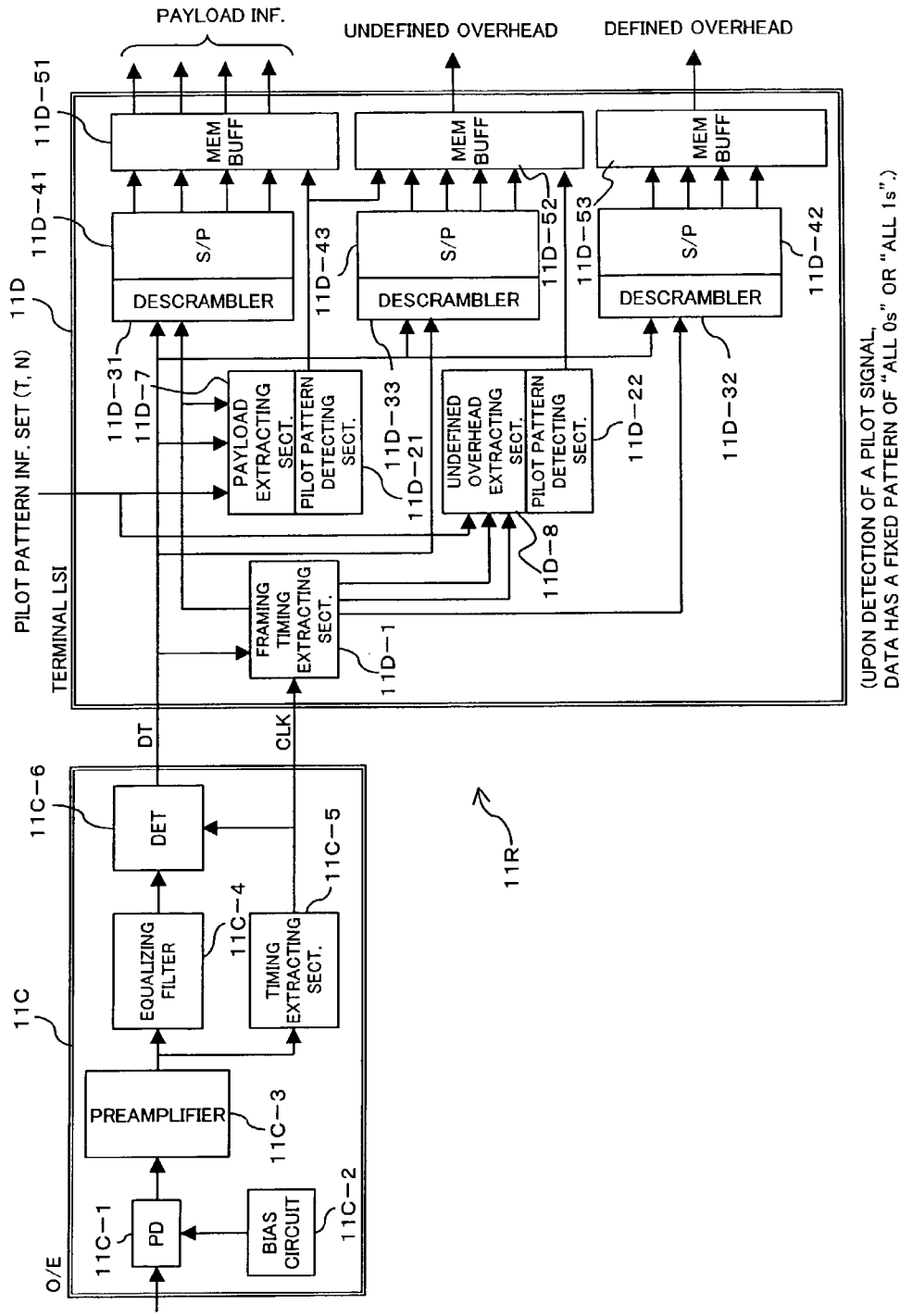
FIG. 17 is a block diagram depicting the transponder (receiver) of FIG. 1 in the seventh mode.

(A7) Seventh Mode of Transponder 11—Separate Pilot Signals are Inserted into an Undefined Overhead and a Payload:

FIG. 16(A) and FIG. 17 show a transponder 11 in a seventh mode. FIG. 16(A) depicts a construction of a transmitter 11S of the transponder 11; FIG. 17 depicts a construction of a receiver 11R of the transponder 11. In FIG. 16(A) and FIG. 17, like reference numbers to those which have already been described designate similar parts or elements, so their detailed description is omitted here.

Referring now to FIG. 16(B), in order to insert separate pilot signals, that is, pilot signal 1 and pilot signal 2, into an undefined overhead 62 and a payload 7, there are arranged, between a P/S section 11A-1 and a frame pattern inserting section 11A-5, a payload scrambler 11A-31, a pilot signal adding section 11A-41 for adding pilot signal 2, an undefined overhead inserting section 11A-21, an undefined overhead scrambler 11A-33, a pilot signal adding section 11A-42 for adding pilot signal 1, a defined overhead inserting section 11A-22, and a defined overhead scrambler 11A-34, in this cited sequence. With no data to be transmitted on a channel, output of the P/S section 11A-1 is bypassed into the pilot signal adding section 11A-41, and output of the undefined overhead inserting section 11A-21 is bypassed into the pilot signal adding section 11A-42.

In the transmitter 11S of the seventh mode, if transmission data is absent, output of the P/S section 11A-1 is bypassed into the pilot signal adding section 11A-41, where pilot signal 2 is inserted in place of payload data 7. The output of the pilot signal adding section 11A-41 passes through the undefined overhead inserting section 11A-21, and then bypasses the undefined overhead scrambler 11A-33 into the pilot signal adding section 11A-42, where pilot signal 1 is inserted in place of undefined overhead information 62.

The output of the pilot signal adding section 11A-42 is then input to the defined overhead inserting section 11A-22, where defined overhead information 61 is added to the input. The defined overhead information 61 is scrambled by the defined overhead scrambler 11A-34, and finally, the frame pattern inserting section 11A-5 adds a frame pattern 5 to the input, thereby generating a data frame with an undefined overhead 62 and a payload 7 which contain pilot signal 1 and pilot signal 2, respectively.

Since separate pilot signals 1 and 2 are inserted in the undefined overhead information 62 and the payload data 7, respectively, it is permissible to use pilot signal 2 (the pilot signal period is T2; the maximum number of 0s allowed to appear consecutively is N2) to indicate that a channel is idle, and it is also permissible to use pilot signal 1 (the pilot signal period is T1; the maximum number of 0s allowed to appear consecutively is N1) to represent (notify) power level control which is carried out by a SAU 17 (35) according to results of spectrum monitoring.

Otherwise, if transmission data is present, the transmission payload data 7 does not take the foregoing bypass route but the following. After the payload scrambler 11A-31 scrambles the payload data 7, the data passes through the pilot signal adding section 11A-41 into the undefined overhead inserting section 11A-21, where undefined overhead information 62 is added to the input. The undefined overhead information 62 is scrambled by the undefined overhead scrambler 11A-33.

The thus scrambled undefined overhead information 62 then passes through a pilot signal adding section 11A-42 into the defined overhead inserting section 11A-22, where defined overhead information 61 is added. The defined overhead scrambler 11A-34 scrambles the defined overhead information 61. Finally, the frame pattern inserting section 11A-5 adds a frame pattern 5 to its input, thereby generating a data frame. Other operations than the above-described are basically similar to those of the foregoing transmitter 11S.

Referring now to FIG. 17, in adaptation to the insertion of separate pilot signals, pilot signal 1 and pilot signal 2, into the undefined overhead 62 and the payload data 7, a terminal LSI 11D of the receiver 11R includes a payload extracting section 11D-7, a terminal LSI 11D-8 for extracting undefined overhead information 62, a pilot pattern detecting section 11D-21 for detecting pilot signal 2 which is inserted into the payload 7, a pilot pattern detecting section 11D-22 for detecting pilot signal 1 which is inserted into the undefined overhead 62.

In order to perform descrambling, S/P conversion, and various kinds of buffer processing for the defined overhead information 61, the undefined overhead information 62, and the payload data 7, separately, the terminal LSI 11D has a descrambler 11D-31, an S/P section 11D-41, and a memory (buffer) section 11D-51, each of which is dedicated to payload data 7. Further, the terminal LSI 11D also has a descrambler 11D-32, an S/P section 11D-42, and a memory (buffer) section 11D-52, each of which is dedicated to defined overhead information 61. Still further, the terminal LSI 11D has a descrambler 11D-33, an S/P section 11D-43, and a memory (buffer) section 11D-53, each of which is dedicated to undefined overhead information 62. Construction other than the above-described is similar to or the same as that already described.

With this construction, in the receiver 11R of the seventh mode, the payload extracting section 11D-7 extracts payload data 7 from a data frame obtained by an O/E section 11C, and the extracted payload data 7 is then descrambled by the descrambler 11D-31. The descrambled output undergoes S/P conversion carried out by the S/P section 11D-41, and is then temporarily stored in the memory section 11D-51.

If the pilot pattern detecting section 11D-21 detects a pilot signal in the payload 7 which has been extracted by the payload extracting section 11D-7, the memory section 11D-51 stores a pattern of ALL 0s or ALL 1s.

In parallel with this, an undefined overhead extracting section 11D-8 extracts an undefined overhead 62 from a data frame which is obtained by the O/E section 11C. The extracted undefined overhead is then descrambled by the descrambler 11D-31, and the descrambled output undergoes S/P conversion carried out by the S/P section 11D-43, and is then temporarily stored in the memory section 11D-53.

If the pilot pattern detecting section 11D-22 detects a pilot signal in the undefined overhead 62 which has been extracted by the undefined overhead extracting section 11D-8, the memory section 11D-53 stores a pattern of ALL 0s or ALL 1s.

The remaining defined overhead 61 is input to the corresponding descrambler 11D-32, which then descrambles the defined overhead 61. After that, the defined overhead information 61 undergoes S/P conversion carried out by the S/P section 11D-42, and is then temporarily stored in the memory section 11D-52.

With such a construction, even in a case where separate pilot signals, pilot signal 1 and pilot signal 2, are inserted into the undefined overhead 62 and the payload 7, it is possible to carry out descrambling, S/P conversion, and various kinds of buffer processing for the defined overhead 61, the undefined overhead information 62, and the payload 7, separately, so that normal signal receiving processing is available.

(B) Details of SAU, 17 and 35:

Details of the SAU, 17 and 35, as has been described with reference to FIGS. 1 and 2, will be explained hereinbelow. In the following description, in cases where no distinction needs to be made between an SAU 17 of the terminal 1 and an SAU 35 of the repeater station 3, both will be simply designated as the "SAU", with no reference character added thereto.

Figure 18:
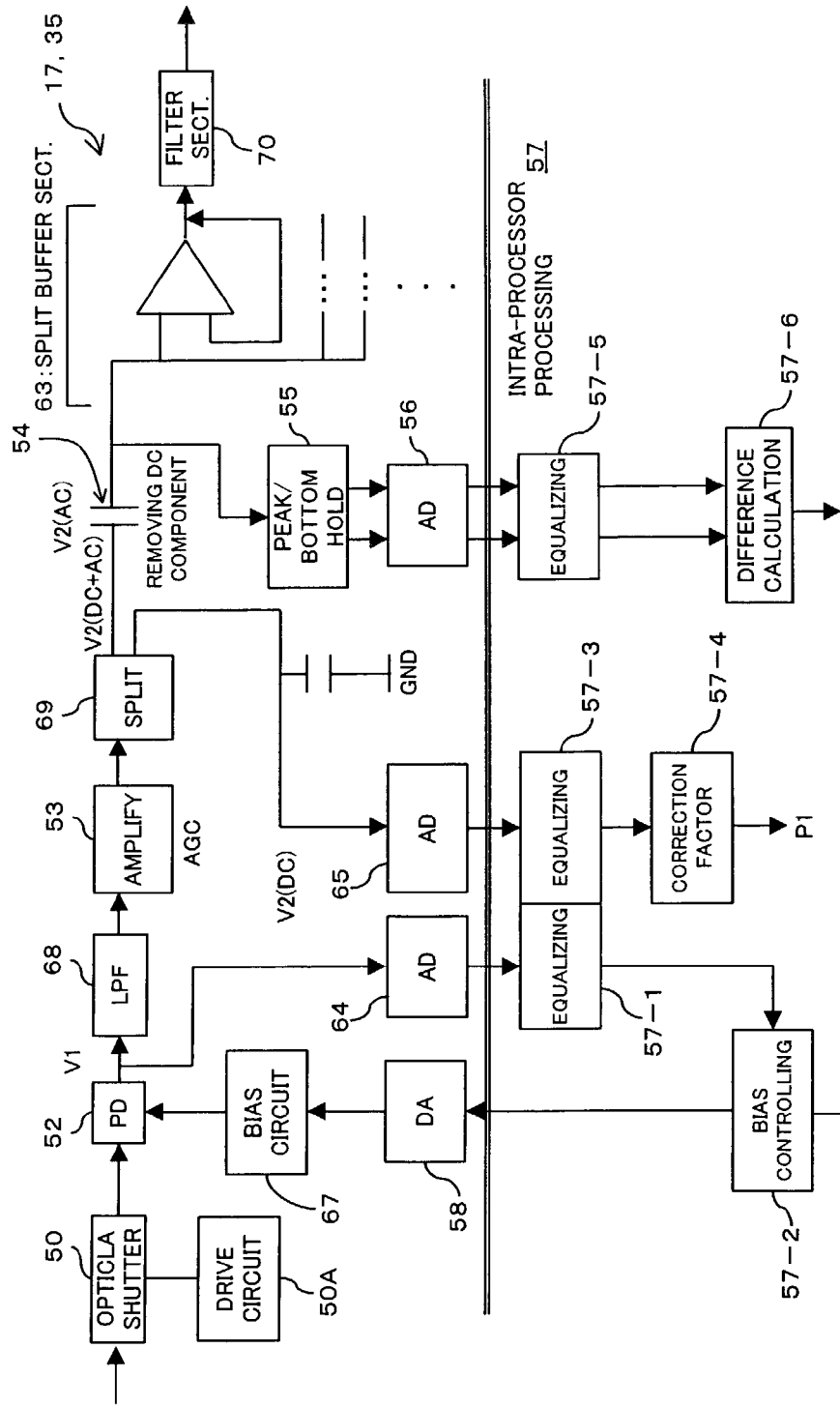
FIG. 18 is a block diagram depicting a spectrum analyzer unit (SAU) of FIG. 1 and FIG. 2 in a first mode.

(B1) SAU in First Mode:

FIG. 18 shows an SAU in a first mode. Referring now to FIG. 18, the SAU has a PD 52, an amplifier 53, a filter 54, a peak/bottom holder circuit 55, an AD converter 56, a CPU 57, and a DA converter 58, as has been already described with reference to FIG. 1 (FIG. 2), and the SAU also has an optical shutter 50, a drive circuit 50A, a split buffer section 63, AD converters 64 and 65, a DA converter 66, a lowpass filter (LPF) 68, and a splitter circuit 69. Additionally, the SAU also includes, as functions realized by the CPU 57, equalizing sections 57-1, 57-3, 57-5, a bias control section 57-2, a correction factor calculating section 57-4, and a difference calculating section 57-6. In FIG. 18, the foregoing filter 54 is realized by a capacitor which removes a DC component from an input signal, and the amplifier 53 is an AGC (Automatic Gain controlled) amplifier.

The optical shutter 50 is controlled by the drive circuit 50A to block input WDM signals received from the aforementioned beam splitting coupler 15, 21, 33, or 39 (see FIGS. 1 and 2). The LPF 68 allows only a predetermined low-frequency component of one output (voltage level V1) of the PD 52 to pass therethrough. The LPF 68 is set, for example, to have a passband such that if the foregoing data frame has a frame period of 8 kHz, channels higher than 4 kHz are cut off.

The splitter circuit 69 splits input electric signals, which have been amplified by the amplifier 53, into two outputs. One of the outputs enters the filter 54, while the other enters the AD converter 65. As has already been described, the filter 54 receives the one of the outputs (voltage level V2), containing a DC (mainly due to an ASE light) and AC components, from the splitter circuit 69. The filter 54 allows the AC component alone to pass through it, blocking the DC components.

With this construction, if a pilot signal is contained in a received data frame, as has been already described, the pilot signal component can be extracted from the received data frame, and its peak and bottom values are held in a peak/bottom holder circuit 55. These values are converted into digital form by the AD converter 56, and are then input to the CPU 57 (the equalizing section 57-5).

The split buffer section 63 splits the output of the filter 54 into multiple signals which correspond in number with the WDM channels. The individual split signals are temporarily held in the split buffer section 63, and then input to filter sections 70 (detailed later) prepared one for each wavelength (channel). The AD converter 64 converts the output of the PD 52 into a digital signal, and the AD converter 65 converts the other one of the outputs of the splitter circuit 69 into digital form. A bias circuit 67 controls a bias current applied to the PD 52, in response to a bias control signal which is obtained by the bias control section 57-2 of the CPU 57 and is then converted into digital form by the DA converter 58.

In the CPU 57, the equalizing section 57-1 performs equalizing processing on the output of the AD converter 64 (that is, the output of the PD 52) to obtain an average of the output voltage level V1 of the PD 52. On the basis of the average value, the bias control section 57-2 generates the foregoing bias control signal. At that time, the bias control section 57-2 calculates the total power P0 of the received WDM signal from an average of output voltage level V1 of the PD 52 and the voltage level of the bias control signal.

The equalizing section 57-3 equalizes the output of the splitter circuit 69 (that is, the output of the amplifier 53), which output has been converted into digital form by the AD converter 65, to obtain an average of the amplified output of the amplifier 53. The correction factor calculating section 57-4 executes factor-correcting processing on the average of amplified output voltage level V2, which has been obtained by the equalizing section 57-3, thereby obtaining a correction value P1 for the amplified output voltage level V2.

The equalizing section 57-5 equalizes the peak and bottom values of the pilot signal component, which values have been converted into digital form by the AD converter 56, and the difference calculating section 57-6 calculates a difference between the thus obtained average values of the peak and bottom values, thereby obtaining amplitude information P3 of the pilot signal component. Here, using the foregoing items P1 and P3, P1/P3 is calculated to obtain an average modulation degree, which is for use in controlling gain of the amplifier 53 and in bias controlling carried out by the bias control section 57-2.

Figure 20:
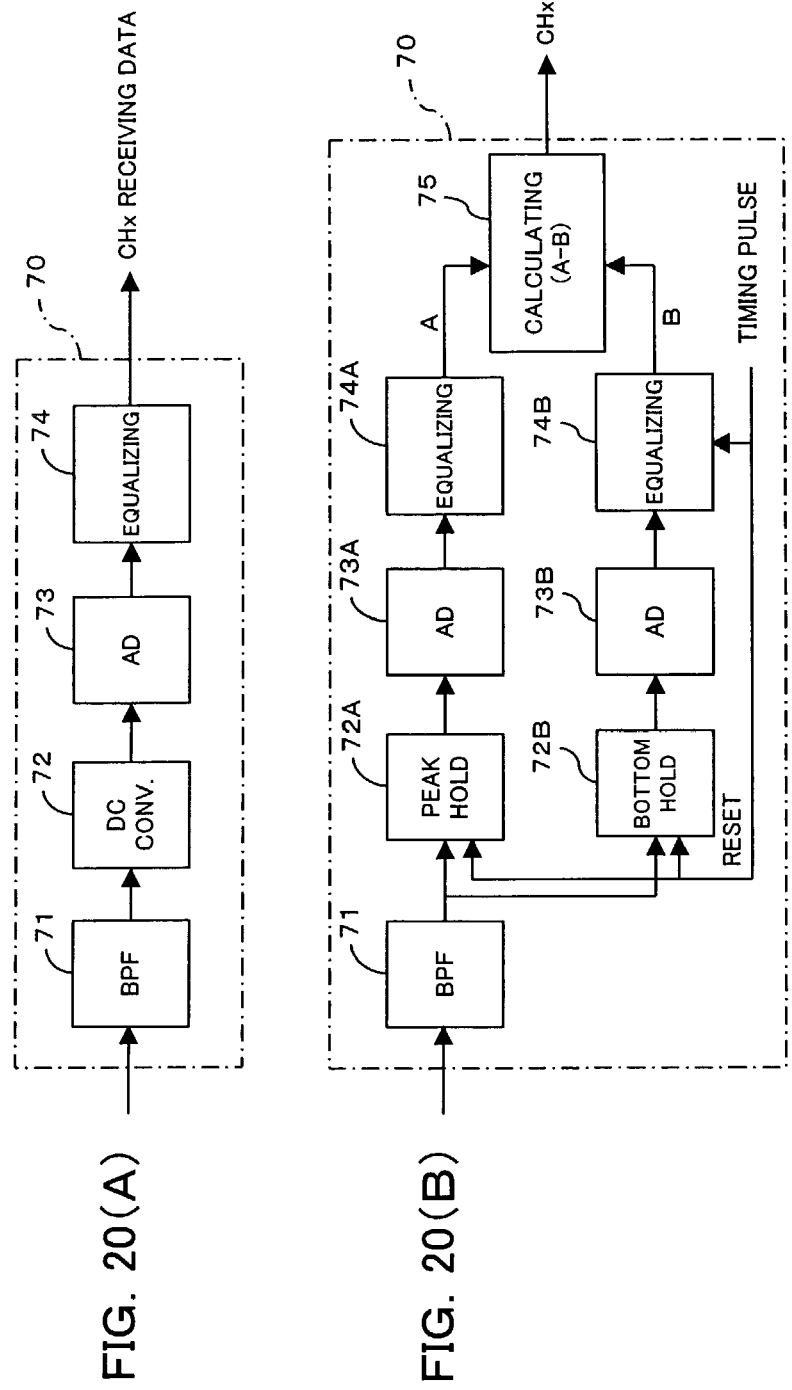
FIG. 20, (A) and (B), is a block diagram depicting a filter section disposed posterior to a split buffer section of FIG. 18 and FIG. 19.

Referring now to FIG. 20(A), each of the filter sections 70, provided one for each channel, has a bandpass filter (BPF) 71, a DC converter 72, an AD converter 73, and an equalizing section 74.

The BPF 71 allows only a frequency component, of the output signal of the split buffer section 63, which component corresponds to channel x (x=1 to n), where n is the number of channels contained in the WDM signal (n is an integer greater than 2). The DC converter 72 converts the frequency component of the channel x, which has passed though the BPF 71, into a DC signal.

The AD converter 73 converts the DC signal of the channel x into digital form. The equalizing section 74 then equalizes the digital signal of the channel x, which has been obtained by the AD converter 73, thereby obtaining an average (CHx receiving data) of the digital signal of the channel x.

That is, the above-mentioned lowpass filter 68 and each filter section 70 (bandpass filter 71) serve as a pilot-signal-detecting filter section, which receives an electric signal from the PD 52 and allows a pilot signal component alone, of the received electric signal, to pass through it. The pilot signal component is unique to the idle optical channel (carrying no transmission data thereon) on which the pilot signal component has been transmitted. Note that the functions of the filter section 70 are realized by the CPU 57 as part of its functions.

With this construction, an SAU of the present embodiment measures the power, OSNR, and average OSNR of the received WDM signal on each channel in the following manner.

A WDM signal input through the optical shutter 50 is converted by the PD 52 into an electric signal (voltage level V1). After the LPF 68 cuts off the electric signal's frequency components of 4 kHz or higher, the signal is input to the amplifier 53 to be amplified. At that time, the output of the PD 52 then enters the bias control section 57-2, via the AD converter 64 and the equalizing section 57-1, for use in bias feedback control carried out by the PD 52.

Further, the output of the amplifier 53 is split by the splitter circuit 69 into two outputs, and one of them is input into the AD converter 65, and the other, into the filter 54. The AD converter 65 converts the amplified output (voltage level V2) into digital form, and then inputs the digital signal to the equalizing section 57-3. The equalizing section 57-3 obtains an average of the output voltage level V2, and the correction factor calculating section 57-4 calculates a correction value P1 for the average value.

In the meantime, the filter 54 allows an AC component (pilot signal component) alone, out of the input signal received from the splitter circuit 69, to pass therethrough, and the output of the filter 54 is input to both of the peak/bottom holder circuit 55 and the split buffer section 63. As a result, the peak/bottom holder circuit 55 holds a peak and bottom values of the pilot signal component. These values are converted into digital form by the AD converter 56, and the equalizing section 57-5 obtains their average values. The difference calculating section 57-6 then calculates a difference between those average values, thereby obtaining the pilot signal's amplitude information P3.

Figure 22A:
FIG. 22, (A) through (C), is a view for describing spectrum measuring methods carried out by a CPU of FIG. 18 and FIG. 19.

On the other hand, the signal which is split into the split buffer section 63 is divided by the split buffer section 63 into n outputs which correspond in number to the channels of the WDM signal. The split outputs are input, one to each filter section 70, where CHx receiving data is obtained by the BPF 71, the DC converter 72, the AD converter 73, and the equalizing section 74. The thus obtained CHx receiving data is for use in the CPU 57's factor correction processing (see FIG. 22(A)).

Specifically, in a case where the filter sections 70 are provided, one for each channel, in parallel, it is required that variation (deviation) due to difference in the circuitry conversion efficiency among the filter sections 70 be compensated for. Hence, the CPU 57 multiplies each item of CHx receiving data by a factor Kx (P0), thereby obtaining the channel power Pchx of each WDM channel. Here, taking into consideration the fact that the voltage level V1 depends on bias control by the PD 52, the factor Kx (P0) is expressed as a function of the total power P0 obtained by the bias control section 57-2. Actually, the factor Kx (P0) is expressed by the production of the total power P0 and a constant.

Figure 22B:
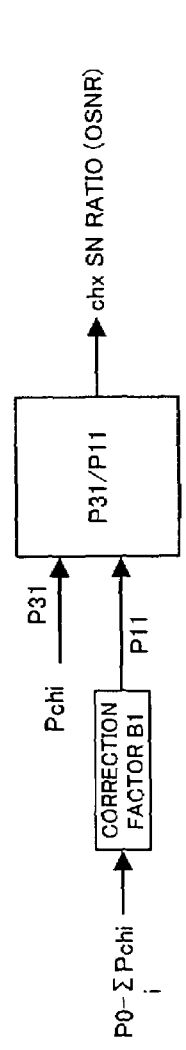

The CPU 57, as shown in FIG. 22(B), obtains OSNR of each channel, by dividing the thus obtained channel power Pchx (P31) of each channel by a value P11, where the value P11 is obtained by the following expression:

P11=(total power P0−the sum total of channel power Pchx of the multiple channels)×correction factor B1 where, B1=grid width per channel/EDF gain-bandwidth.

Figure 22C:
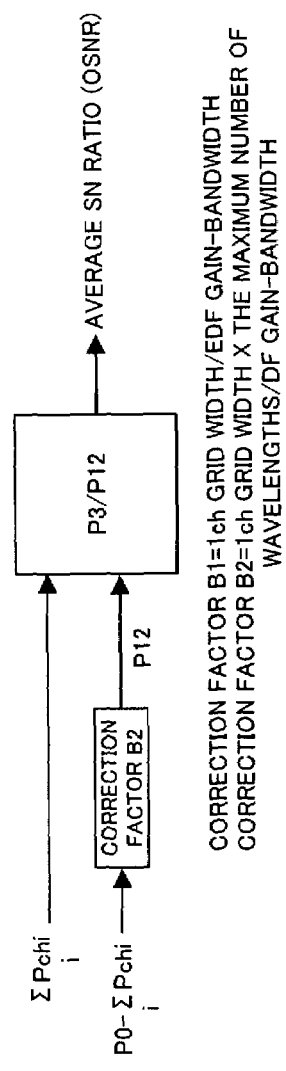

The CPU 57, as shown in FIG. 22(C), obtains an average OSNR of a WDM signal containing multiple channels, by dividing the sum total (P3) of the channel power of the multiple channels by a value P12, where the value P12 is obtained by the following expression:

P12=(total power P0−the sum total of channel power Pchx of the multiple channels)×correction factor B2 where, B2=channel grid width×the maximum number of channels/EDF gain-bandwidth.

The foregoing filter section 70 may be constructed, for example, as shown in FIG. 20(B). Specifically, the filter section 70 of FIG. 20(B) has a BPF 71, a peak holder circuit 72A, a bottom holder circuit 72B, AD converters 73A and 73B, equalizing sections 74A and 74B, and a difference calculating section 75. A peak and bottom values of a pilot signal component which passes through the BPF 71 are held in the peak holder circuit 72A and the bottom holder circuit 72B, respectively. The peak and bottom values each are converted into digital form by the corresponding AD converters 73A and 73B, respectively, and average values of those are obtained by the equalizing sections 74A and 74B, respectively. The difference calculating section 75 then calculates the difference between the average values.

This construction, in comparison with the construction depicted in FIG. 20(A), makes it possible to obtain CHx receiving data with improved precision.

Further, with use of a passband-variable BPF, instead of the passband-fixed BPF 71, the necessity for the multiple filter sections 70, one for each channel, in parallel is eliminated. Theoretically speaking, a single variable BPF can cover all the channels. In that case, however, the trace width of the passband of the variable BPF is increased, resulting in increased measuring time.

Therefore, the multiple channels of the WDM signal are grouped into several channel groups, and each of the groups is given a filter section 70 with a variable BPF which covers a band of the individual channel group. It is thus possible to obtain CHx receiving data by using filter sections 70 significantly reduced in number than the channels, thus restraining increase of the measuring time.

Figure 21:
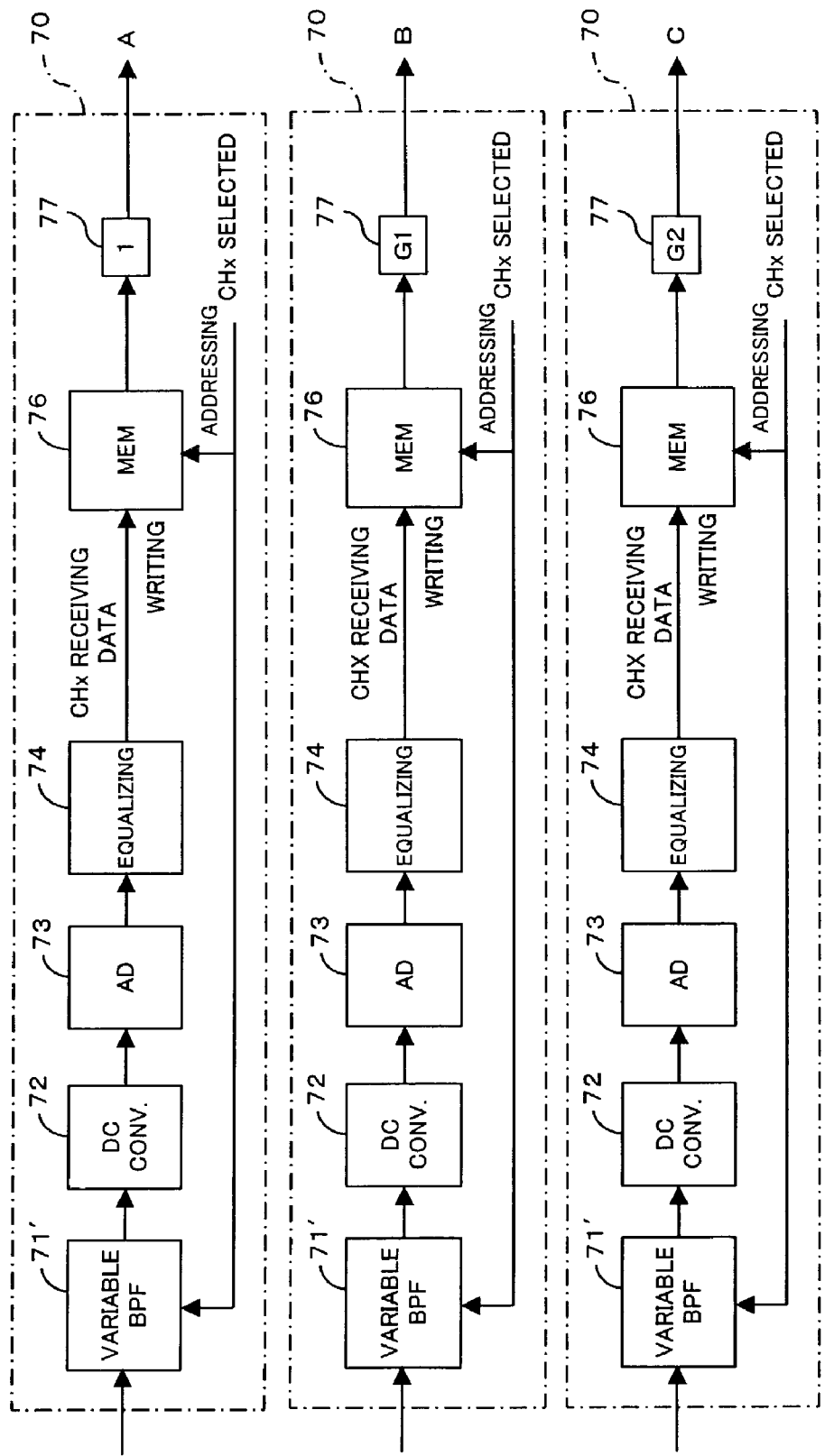
FIG. 21 is a block diagram depicting a filter section disposed posterior to the split buffer section of FIG. 18 and FIG. 19.

For example, assuming the channels constituting a WDM signal are divided into three channel groups, there should be prepared three filter sections 70 for the same number of routes. Each of the filter sections 70, as shown in FIG. 21, for example, has a BPF 71', a DC converter 72, an AD converter 73, an equalizing section 74, a memory 76, and a factor multiplier section 77. The CHx receiving data, which is obtained from a pilot signal of one of the channel groups and which passes through a BPF 71' prepared for the channel group, is stored in the memory 76 on a channel-by-channel basis.

In this case, also, since two or more filter sections 70 are provided, one for each channel group, in parallel, probable circuitry errors among the channel groups should be taken into consideration. It is the factor multiplier section (error correcting section) 77 that takes in charge of the correcting of such circuitry errors. More specifically, on initial operation of the present apparatus, CHx receiving data on one and the same channel is input to the filter sections 70. The factor multiplier section 77 then stores factors (error correction factors) such that equal outputs can be obtained among the filters 70, and uses the factors to correct circuitry errors which would be detected in the CHx receiving data during later operations. In FIG. 21, factor "1", factor "G1", and factor "G2" are stored in the upper-most factor multiplier section 77, the middle factor multiplier section 77, and the lower-most factor multiplier section 77, respectively.

In other words, the CPU 57, which serves as a spectrum measuring means, also carries a function as an error-correction-factor calculating section for calculating an error correction factor such that, if the same channel is input to the variable BPFs 71' at initialization of the apparatus, the same pilot signal data component is output from each of the variable BPFs 71'. On the basis of the error correction factor obtained by the error-correction-factor calculating section, the factor multiplier section 77 performs error-correcting processing on the outputs of the BPFs 71', while the apparatus is in operation.

As has been described under item (A), if the pilot signal is constantly transmitted by using an overhead 6 (for example, an undefined overhead 62), it is possible for a receiving end to detect the pilot signal constantly on every channel. Otherwise, if the pilot signal is transmitted only on an idle channel (for example, in a case where only a payload 7 is used to carry a pilot signal), no pilot signal is detected on a busy channel (where transmission data is stored in the payload 7).

Figure 23:
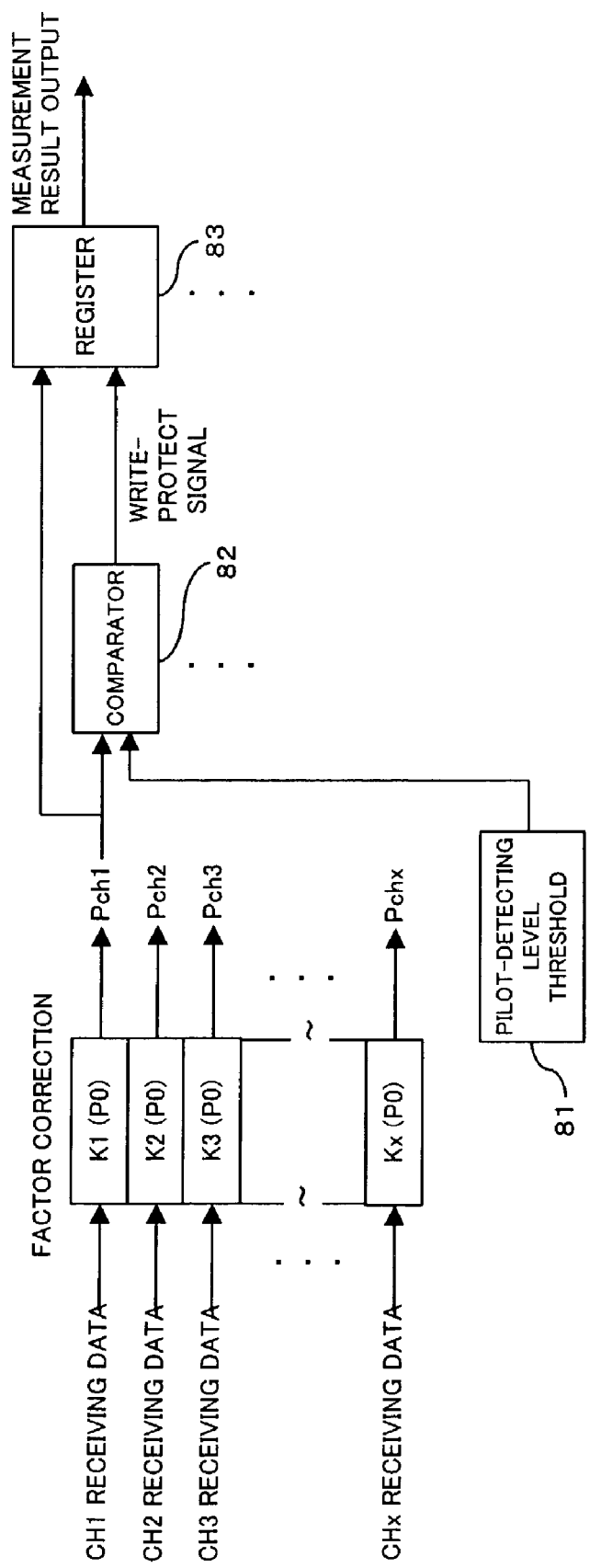
FIG. 23 is a block diagram for describing a channel power overwrite-protect function carried out by the CPU of FIG. 18 and FIG. 19.

In order to guarantee the above-described spectrum measurement even in the latter case, it is required to pre-store pilot signal components (CHx receiving data) which are detected while the channels are idle. Hence, as in the example of FIG. 23, a register (holder circuit) 83 is provided to store the channel power Pchx obtained by the above-described factor correction processing.

A comparator 82 then compares current channel power Pchx, with the threshold of the channel power Pchx, which is held in a pilot-detecting-level threshold holder section 81. As a comparison result, if the current channel power Pchx is the threshold or smaller, it is judged that the pilot signal is absent, and output of the comparator 82 is supplied to the register 83 as a write-protect signal to prevent the previously measured channel power Pchx now in the register 83 from being overwritten.

It is thus possible to avoid conceivable effects on spectrum measurement, which effects would be caused by a removed (undetectable) pilot signal unavoidably deleted as a channel is busy. Hence, even if pilot signals cannot be detected in real time on all of the channels concurrently, it is still possible to measure the spectrum of the input WDM signal in a normal way.

In other words, the CPU 57 of the present embodiment serves also as an optical signal quality calculating section for calculating OSNR of a light signal on each channel, based on the channel power Pchx (amplitude information), stored in the register 83, of the corresponding channel while idle.

Figure 19:
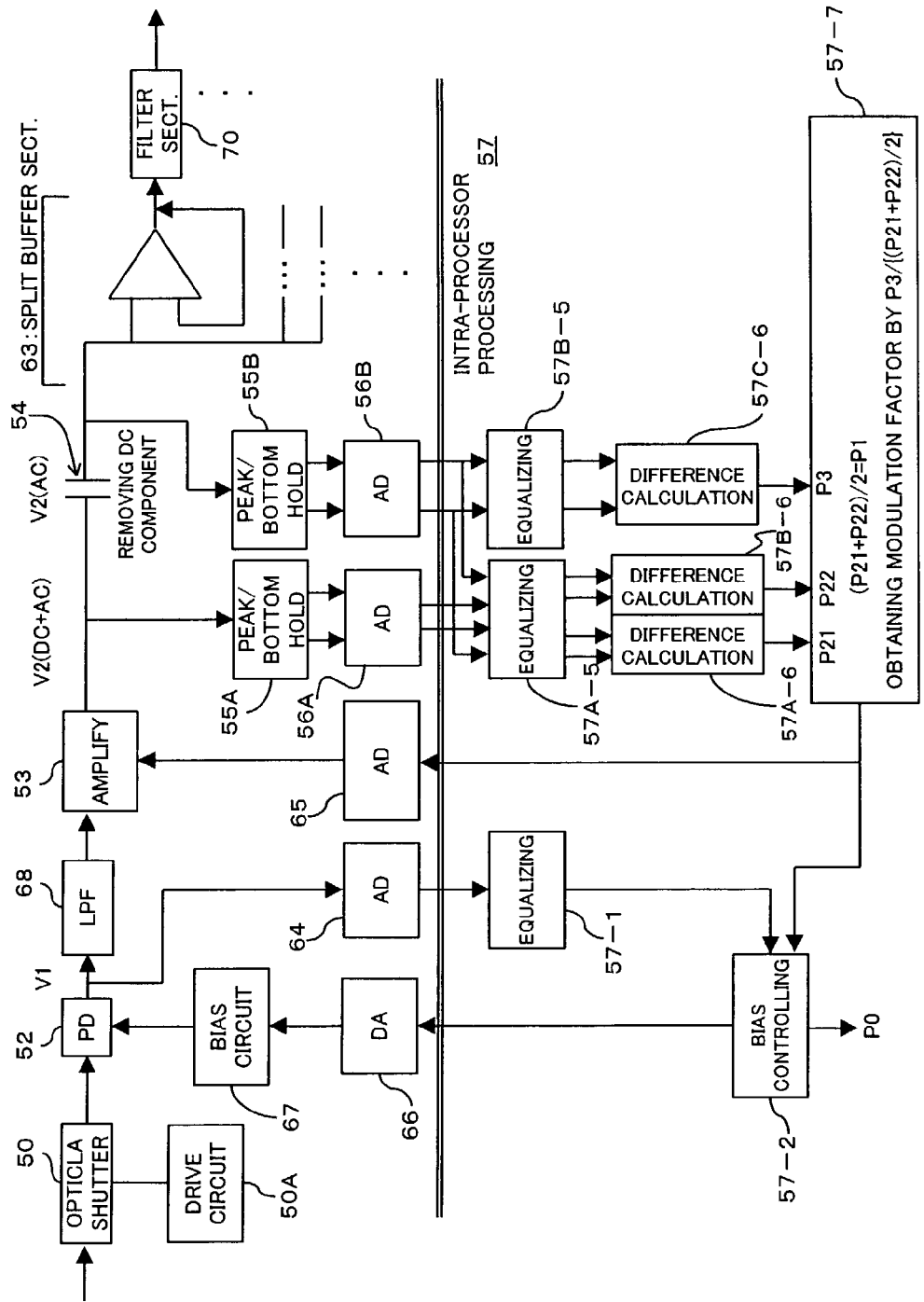
FIG. 19 is a block diagram depicting a spectrum analyzer unit (SAU) of FIG. 1 and FIG. 2 in a second mode.

(B2) SAU in Second Mode:

FIG. 19 shows an SAU in a second mode. This SAU differs from that of FIG. 18 in that a peak/bottom holder circuit, 55A and 55B, an AD converter, 56A and 56B, are disposed both before and after the filter 54. Moreover, as functions realized by the CPU 57, the SAU is also provided with an equalizing section, 57A-5 and 57B-5, a difference calculating section, 57A-6, 57B-6, 57C-6, and an arithmetic operation section 57-7.

Here, the peak/bottom holder circuit 55A holds peak and bottom values of output (voltage level V2) of the amplifier 53, from which output the filter 54 has not yet removed a DC component. The AD converter 56A converts each of the peak and bottom values stored in the peak/bottom holder circuit 55A into digital form.

The peak/bottom holder circuit 55B and the AD converter 56B are similar to the peak/bottom holder circuit 55 and the AD converter 56 of FIG. 18, respectively. The peak/bottom holder circuit 55B stores a peak and bottom values of the amplifier output (that is, a pilot signal component) after the filter 54 removes a DC component therefrom. The AD converter 56B converts each of the peak and bottom values stored in the peak/bottom holder circuit 55B into digital form.

After that, in the CPU 57, the equalizing section 57A-5 obtains averages of the peak and bottom values of the digital signals (two pairs of peak and bottom values of an input and output signals to and from the filter 54), which values have been obtained by the AD converters 56A and 56B. In the meantime, the equalizing section 57B-5 obtains averages of the peak and bottom values of the digital signals (the output signal (pilot signal component) output from the filter 54), which have been obtained by the AD converter 56B.

Using the two pairs of the peak and bottom average values, which have been obtained by the equalizing section 57A-5, the difference calculating section 57A-6 calculates a difference between the average peak value of one of the two pairs and the average bottom value of the other of the pairs, thereby obtaining amplitude information P21, while the difference calculating section 57B-6 calculates a difference between the remaining average peak and bottom values of the two pairs, thereby obtaining amplitude information P22.

The equalizing section 57B-5 and the difference calculating section 57C-6 are similar to those that have been described with reference to FIG. 18. As in the case of FIG. 18, the equalizing section 57B-5 obtains averages of the peak and bottom values of the pilot signal component, which values have been converted into digital form by the AD converter 56B, and the difference calculating section 57C-6 calculates a difference between the thus obtained average values, thereby obtaining amplitude information P3 of the pilot signal.

After that, the arithmetic operation section 57-7 calculates (P21+P22)/2, where P21 and P22 are amplitude information obtained by the foregoing difference calculating sections 57A-6 and 57B-6, respectively, and thereby an average value P1 of the amplitude information P21 and P22 is obtained. Using the thus obtained average value P1 and the amplitude information P3, which has been obtained by the difference calculating section 57C-6, the arithmetic operation section 57-7 further calculates P3/P1, thereby obtaining a modulation degree for use in bias controlling on the PD 52 carried out by the bias control section 57-2.

In other words, with use of the SAU in the second mode, a bias applied to the PD 52 can be adjusted with improved accuracy, based on the averages of the peak and bottom values of the signal from which its DC component has not yet been removed. Accompanying this, the spectrum measurement itself is also improved in accuracy. At that time, the CPU 57 carries out spectrum measurement in a similar manner to that which has been described referring to FIG. 22(A) through FIG. 22(C). Further, the filter section 70 may have a construction similar to that which has been described with reference to FIG. 20(A), FIG. 20(B), or FIG. 21. Still further, the channel power Pchx of channels which is obtained while the channels are idle, may be stored in the register 83 (see FIG. 23), as has already been described.

Figure 25:
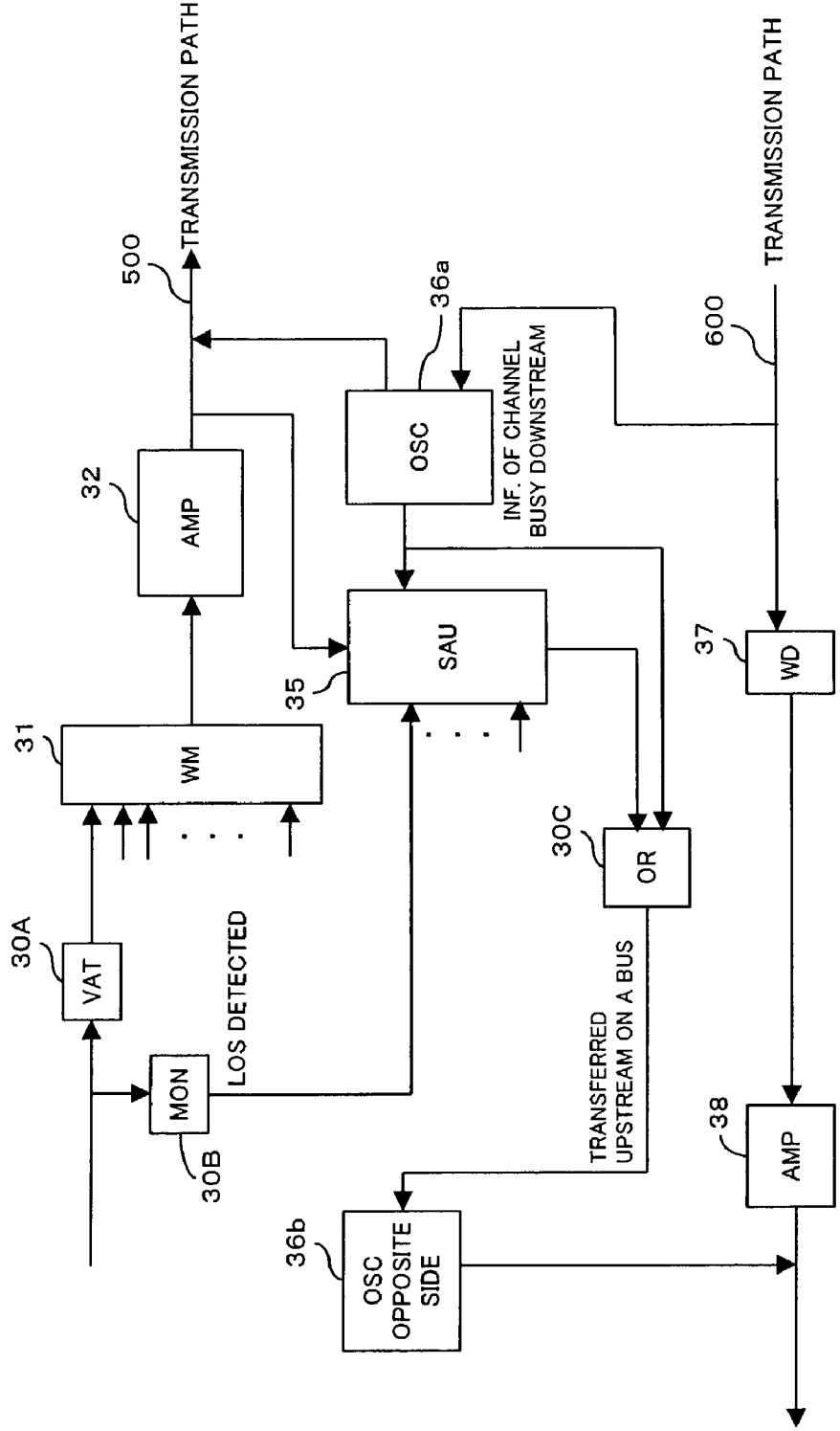
FIG. 25 is a block diagram for describing an operation which is carried out when the SAU of FIG. 19 detects the input light interrupt state.

(C) Other Modifications:

If a channel falls in input interrupt (loss of signal) in the above-described embodiment, it is permissible to use the channel to superimpose data to be transmitted thereon, although the aforementioned pilot signal, which indicates that the channel is idle, is absent. Hence, as shown in FIG. 25, loss-of-signal detection couplers 30B are provided, one for each channel-dedicated input port of the WDM communication apparatus. The loss-of-signal detection coupler 30B splits off part of the signal light on each channel into the SAU 35. If the SAU 35 detects a state of loss of signal, notification as such is transmitted from the OSC to an upstream device (an OADM node, or the like). With this construction, upon receipt of such loss-of-signal detection information, the node evaluates whether or not the channel can be used to transmit new data, thus coordinating use of the channels.

In FIG. 25, like reference numbers to those that have already been described designate similar parts or elements, so their detailed description is omitted here. The reference character "30A" designates an optical variable attenuator for adjusting the level of a light signal on each channel; and "30C", an OR circuit for ORing (1) the notification information (the aforementioned loss-of-signal detection information, channel-busy information of the present apparatus detected by the SAU 35, or the like) received from the SAU 35 and (2) busy information (indicating which channels are being used at a downstream node) from a downstream side, which information is detected by the OSC section 36a.

In the construction of FIG. 25, the OSC of the downstream node is capable of notifying an upstream node that a specific channel is being used downstream. Upon receipt of this notification, it is possible for the upstream node to avoid erroneously judging the channel is idle (it is possible for the upstream node to coordinate the use of the channels, based on the channel-busy state monitored by the SAU 35 and on the downstream channel busy/idle state obtained by the OSC).

Figure 24:
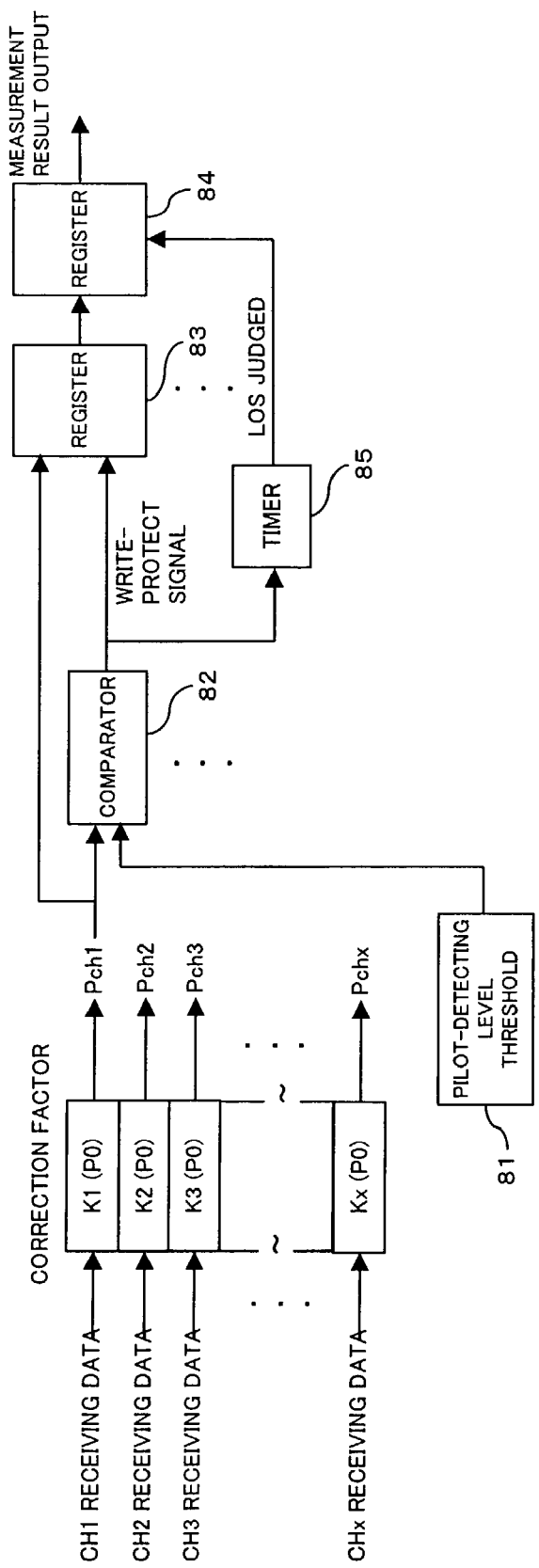
FIG. 24 is a block diagram for describing a function of detecting a loss-of-signal (input interrupt) state, which function is carried out by the CPU of FIG. 18 and FIG. 19.

Further, the above-described loss-of-signal detection can be realized by utilizing a pilot signal, without using any loss-of-signal detection coupler 30B. Specifically, the maximum available period is previously set for each channel on a transmitter end. Channel are made idle when their predetermined time periods lapse, and a pilot signal is then transmitted on the channel for a specific period. An SAU of a receiving end, as shown in FIG. 24, for example, has a register 84 and a timer 85, in place of the construction depicted in FIG. 23. If the register 83 is kept write-protected for the foregoing predetermined period, which is timed by the timer 85, the information (channel power Pchx) stored in the register 84, which information is the same as that stored in the register 83, is rewritten into the loss-of-signal detection information.

With no detection of a pilot signal on a channel in the foregoing predetermined period, the SAU judges the channel is in a loss-of-signal state. The loss-of-signal detection coupler 30B is thus no longer required.

Figure 26:
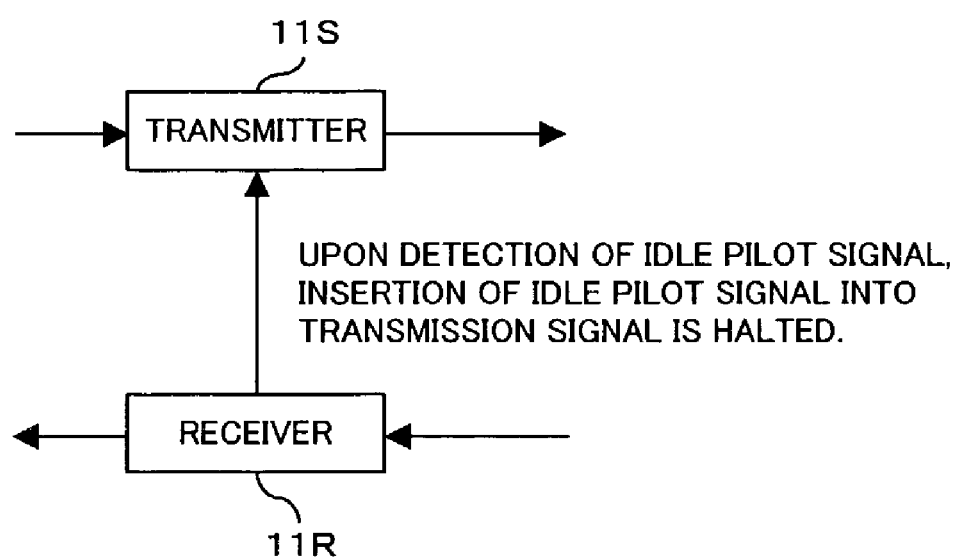
FIG. 26 is a block diagram for describing a function of stopping, upon detection of a pilot signal, a transmitter end from sending out a pilot signal according to the present invention.

Further, as shown in FIG. 26, if the receiver 11R (see FIGS. 4, 8, 10, 12, 15, and 17) of the transponder 11, as has been described above, detects a pilot signal, the transmitter 11S (see FIGS. 3, 7, 9, 11, 13, 14, and 16) halts insertion of a pilot signal into a transmission data frame, thereby notifying a downstream node of the detection of the pilot signal.

More specifically, the transponder 11 is equipped with a pilot signal transmission halting means. If the pilot pattern detecting section (pilot signal detecting means) 11D-2 (or 11D-21, 11D-22) of the receiver 11R detects a pilot signal, the pilot signal transmission halting means stops a pilot signal adding section 11A-4 (or 11A-41, 11A-42) which is provided for a channel corresponding to the detected pilot signal, from adding a pilot signal, thereby consequently stopping the E/O section 11B from sending out a pilot signal.

With this construction, even without using an OSC, it is still possible to notify a downstream node of availability of the WDM channels, so that increment of the capacity of the OSC is restrained. In this case, it is preferable that separate pilot signals are prepared to transmit in a transmission direction and in its opposite direction. One of the pilot signals is stored in an overhead 6 to indicate a channel is idle in the transmission direction, while the other is stored in a payload 7 to indicate a channel is idle in the opposite direction.

Further, the present invention should by no means be limited to the above-illustrated embodiment, but various changes or modifications may be suggested without departing from the gist of the invention.

What is claimed is:

1. An optical communication system having a plurality of optical communication apparatuses for transmitting a plurality of optical channels,
   of the plurality of optical communication apparatuses,
   a first optical communication apparatus which sends out optical channels, including:
   (a1) means for evaluating whether or not user data to be transmitted on an object one of the plurality of optical channels exists; and
   (a2) means for transmitting, if said evaluating means judges that user data to be transmitted on said object optical channel is absent, pilot signal data which has a pattern corresponding to said object optical channel, and
   a second optical communication apparatus which receives said optical channels from said first optical communication apparatus, including:
   (b1) means for detecting said pilot signal data in the received optical channels; and
   (b2) means for calculating amplitude information of an optical signal of each of said optical channels based on amplitude information of a pilot signal component detected by said means for detecting said pilot signal data, and calculating a quality of the optical signal based on the amplitude information of the optical signal.

2. A wavelength-division multiplex (WDM) communication apparatus for use in a wavelength-division multiplexed communication system in which a plurality of WDM optical channels are transmitted at separate wavelengths, said apparatus comprising:
   (a1) means for evaluating whether or not user data to be transmitted on an object one of the plurality of WDM optical channels exists; and
   (a2) means for transmitting, if said evaluating means judges that user data to be transmitted on said object WDM optical channel is absent, pilot signal data which is unique to said object WDM optical channel, wherein said pilot signal transmitting means (a2) includes a framing section for framing a frame signal which has an overhead and a payload, said framing section storing user data to be transmitted in said payload of said frame signal,
   said framing section including a pilot signal adding section for storing said pilot signal data in either one or both of said overhead and said payload, if said evaluating means (a2) judges that user data to be transmitted on said object WDM optical channel is absent.

3. An apparatus according to claim 2, wherein said pilot signal adding section is adapted to store said pilot signal data in said payload.

4. An apparatus according to claim 2, wherein said pilot signal adding section is adapted to store said pilot signal data in said overhead.

5. An apparatus according to claim 2, wherein said pilot signal adding section is adapted to store said pilot signal data in both of said overhead and said payload.

6. An apparatus according to claim 4, wherein said pilot signal adding section is adapted to store said pilot signal data in an unused area of said overhead.

7. An apparatus according to claim 5, wherein said pilot signal adding section is adapted to store said pilot signal data in an unused area of said overhead.

8. An apparatus according to claim 2, wherein said pilot signal adding section is adapted to store a plurality of types of pilot signal data in an area composed of said overhead and said payload.

9. A wavelength-division multiplex (WDM) communication apparatus for use in a wavelength-division multiplexed communication system in which a plurality of WDM optical channels are transmitted at separate wavelengths, said apparatus comprising:
- (a1) means for evaluating whether or not user data to be transmitted on an object one of the plurality of WDM optical channels exists; and
- (a2) means for transmitting, if said evaluating means judges that user data to be transmitted on said object WDM optical channel is absent, pilot signal data which is unique to said object WDM optical channel, wherein, with elapse of a predetermined maximum period while an optical channel in a non-idle state, said pilot signal transmitting means (a2) halts user data transmission on the WDM optical channel, making said WDM optical channel idle, and transmits said pilot signal data on said WDM optical channel for a predetermined time period.

10. An optical communication apparatus for use in an optical communication system in which a plurality of optical channels are transmitted, said apparatus comprising:
- (b1) means for detecting a channel-unique pilot signal data having a pattern, which is transmitted on an idle optical channel with no user data being carried thereon, in received optical channels; and
- (b2) means for calculating amplitude information of an optical signal of each of said optical channels based on amplitude information of a pilot signal component detected by said means for detecting said pilot signal data, and calculating a quality of the optical signal based on the amplitude information of the optical signal, wherein said received optical channels are received at least in part from another optical communication apparatus comprising:
  - (a1) means for evaluating whether or not user data to be transmitted on an object one of the plurality of optical channels exists; and
  - (a2) means for transmitting, if said evaluating means (a1) judges that user data to be transmitted on said object optical channel is absent, pilot signal data which has a pattern corresponding to said object optical channel.

11. An apparatus according to claim 10, further comprising optical transmitting means for superimposing user data to be transmitted on said idle optical channel, which has been detected by said evaluating means, and transmitting the user data on said optical channel to another optical communication apparatus of the optical communication system.

12. An apparatus according to claim 10, further comprising means for providing notification of the detection results, which have been obtained by said evaluating means, to another optical communication apparatus of the optical communication system.

13. An apparatus according to claim 12, wherein said notifying means serves as a supervisory control information transmitting section for notifying said another optical communication apparatus of the evaluation results, which have been obtained by said evaluating means, using one of the plurality of optical channels which is assigned for transmitting/receiving supervisory control information.

14. A wavelength-division multiplex (WDM) communication apparatus for use in a wavelength-division multiplexed communication system in which a plurality of WDM optical channels are transmitted at separate wavelengths, said apparatus comprising:
- (b1) means for detecting a channel-unique pilot signal data, which is transmitted on an idle WDM optical channel with no user data being carried thereon, in received WDM optical channels;
- (b2) means for evaluating whether or not each of the plurality of WDM optical channels is idle, according to detection results obtained by said pilot signal detecting means (b1); and
- (e) means for measuring a spectrum of each of the WDM optical channels, said pilot signal detecting means (b1) including:
  - an opto-electric converter for receiving the plurality of WDM optical channels at separate wavelengths and outputting an electric signal corresponding to optical power of the channels; and
  - a pilot-signal-detecting filter section for transmitting, of the electric signal received from said opto-electric converter, a pilot signal data component unique to an idle WDM optical channel, which currently carries no user data, and
  said spectrum measuring means (e) measuring the spectrum of each of the WDM optical channels according to amplitude information of said pilot signal data component which passes through said pilot-signal-detecting filter section.

15. An apparatus according to claim 14, wherein said spectrum measuring means (e) includes:
- a holder circuit for holding amplitude information of the individual WDM optical channels separately; and
- an optical signal quality calculating section for calculating quality of the individual WDM optical channels based on amplitude information of the individual WDM optical channels while the channels are idle, the amplitude information being stored in said holder circuit.

16. An apparatus according to claim 15, further comprising:
- (f) means for detecting loss of signal; and
- (g) means for providing notification of said loss of signal to other optical communication apparatus of the optical communication system, if said loss-of-signal detecting means (f) detects the loss of signal.

17. A wavelength-division multiplex (WDM) communication apparatus for use in a wavelength-division multiplexed communication system in which a plurality of WDM optical channels are transmitted at separate wavelengths, said apparatus comprising:
- (b1) means for detecting a channel-unique pilot signal data, which is transmitted on an idle WDM optical channel with no user data being carried thereon, in received WDM optical channels; and
- (b2) means for evaluating whether or not each of the plurality of WDM optical channels is idle, according to detection results obtained by said pilot signal detecting means (b1), wherein another WDM communication apparatus in the wavelength-division multiplexed communication system is organized in such a manner that, with elapse of a predetermined maximum period while a WDM optical channel in a non-idle state, (1) user data transmission on said WDM optical channel is halted, so that said WDM optical channel becomes idle, and (2) said pilot signal data is transmitted on said WDM optical channel for a predetermined time period,
said evaluating means (b2) includes means for recognizing, if none of said pilot signal data has been detected during the predetermined maximum period, that said optical channel, corresponding to said pilot signal data, is in a loss of signal.

18. An optical communication apparatus for use in transmitting a plurality of optical channels at separate wavelengths to other optical communication apparatus in an optical communication system, said apparatus comprising:

a transmitter, including:
- (a1) means for evaluating whether or not user data to be transmitted on an object one of the plurality of optical channels exists; and
- (a2) means for transmitting, if said evaluating means judges that user data to be transmitted on said object optical channel is absent, pilot signal data, which is unique to said object optical channel, to a second optical communication apparatus of the optical communication system;

a receiver, including:
- (b1) means for detecting pilot signal data in optical channels which are received from said second optical communication apparatus; and
- (b2) means for calculating amplitude information of an optical signal of each of said optical channels based on amplitude information of a pilot signal component detected by said means for detecting said pilot signal data, and calculating a quality of the optical signal based on the amplitude information of the optical signal; and means for stopping, upon detection of the pilot signal data by said pilot signal detecting means (b1) of said receiver, said pilot signal transmitting means (a2) from transmitting the pilot signal data on the optical channel which corresponds to the detected pilot signal.

19. A wavelength-division multiplex (WDM) communication apparatus for use in transmitting a plurality of WDM optical channels at separate wavelengths to other WDM communication apparatus in a wavelength-division multiplexed communication system, said apparatus comprising:

means for detecting pilot signal data, which indicates absence of user data being transmitted on a WDM optical channel, in the plurality of WDM optical channels, including: an opto-electric converter for receiving the plurality of WDM optical channels at separate wavelengths and outputting an electric signal corresponding to optical power of the channels; and a pilot-signal-detecting filter section for transmitting, of the electric signal received from said opto-electric converter, a pilot signal data component unique to an idle WDM optical channel which transmits no user data; and means for measuring a spectrum of each of the WDM optical channels according to amplitude information of said pilot signal data component which passes through said pilot-signal-detecting filter section.

20. An apparatus according to claim 19, wherein said pilot-signal-detecting filter section includes:
- a lowpass filter for blocking, of the electric signal received from said opto-electric converter, a frequency component higher than said pilot signal data component; and
- a plurality of bandpass filters, one for each of the WDM optical channels, each of said bandpass filters having a fixed passband and transmitting only a pilot signal data component of the output of said lowpass filter, which component is unique to the passband of the individual bandpass filter.

21. An apparatus according to claim 19, wherein said pilot-signal-detecting filter section includes:
- a lowpass filter for blocking, of the electric signal received from said opto-electric converter, a frequency component higher than said pilot signal data component; and
- a plurality of bandpass filters, one for each of a plurality of groups of the WDM optical channels, each of said bandpass filters having a variable passband and transmitting pilot signal data components of the output of said lowpass filter, which components correspond to the passbands of the individual bandpass filters.

22. An apparatus according to claim 20, wherein said spectrum measuring means includes: an error correcting section for correcting errors in the outputs of the plurality of variable bandpass filters band on an error correction factor; and an error-correction-factor calculating section for calculating said error correction factor such that a same pilot signal data component is output from each of the plurality of variable bandpass filters when one channel is input to the plurality of variable bandpass filters at an initialization of the apparatus.

23. An apparatus according to claim 19, wherein said spectrum measuring section includes:
- a holder circuit for holding amplitude information of the individual WDM optical channels separately; and
- an optical signal quality calculating section for calculating quality of the individual WDM optical channels based on amplitude information of the individual WDM optical channels while the channels are idle, the amplitude information being stored in said holder circuit.

* * * * *